(12) United States Patent
Kashiyama et al.

(10) Patent No.: US 6,692,542 B1
(45) Date of Patent: Feb. 17, 2004

(54) APPARATUS FOR MANUFACTURING SPIRAL ELECTRODE ASSEMBLY

(75) Inventors: Akihiro Kashiyama, Moriguchi (JP); Takayuki Aoi, Hirakata (JP); Minoru Koda, Hirakata (JP); Masaaki Kaneda, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 192 days.

(21) Appl. No.: 09/868,656

(22) PCT Filed: Nov. 24, 2000

(86) PCT No.: PCT/JP00/08312

§ 371 (c)(1),
(2), (4) Date: Jul. 3, 2001

(87) PCT Pub. No.: WO01/39304

PCT Pub. Date: May 31, 2001

(30) Foreign Application Priority Data

Nov. 26, 1999 (JP) .............................. 11-336349
Sep. 11, 2000 (JP) ...................... 2000-274471

(51) Int. Cl.⁷ ................................................ H01M 6/10
(52) U.S. Cl. ....................... 29/623.1; 29/623.3; 29/729; 29/730; 29/743; 29/7
(58) Field of Search ......................... 29/729, 730, 731, 29/738, 742, 623.1, 623.3; 242/444.1

(56) References Cited

U.S. PATENT DOCUMENTS 4,064,288 A * 12/1977 Shah et al. .................... 427/58
5,718,395 A 2/1998 Nakanose et al.

FOREIGN PATENT DOCUMENTS

DE 3233423 3/1984
JP 9-147878 6/1997
WO 97/17736 5/1997

OTHER PUBLICATIONS

English Language Abstract of JP 9–147878.
English Language Abstract of JP 3233423.

* cited by examiner

Primary Examiner—Patrick Ryan
Assistant Examiner—Gregg Cantelmo
(74) Attorney, Agent, or Firm—Greenblum & Bernstein, P.L.C.

(57) ABSTRACT

A separator is inserted into a slit formed in a winding core. A negative electrode plate made of thin metallic foil is fed toward the winding core as being held around the circumferential surface of a tape suction drum that is rotatably supported. The tape suction drum and the winding core are brought in mutual contact under pressure with their respective axes in parallel, and the winding core is driven to rotate, so that the tape suction drum is synchronously rotated with the winding core, by means of the frictional force acting between them, whereby the negative electrode plate held on the tape suction drum is wound onto the winding core together with the separator.

11 Claims, 12 Drawing Sheets

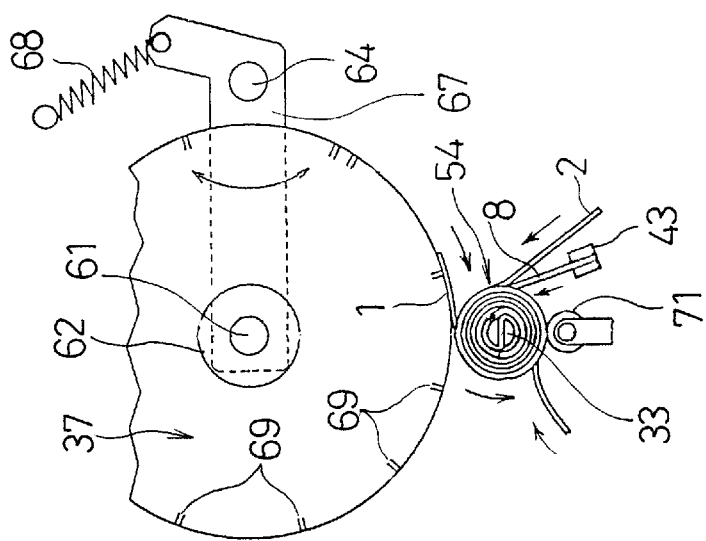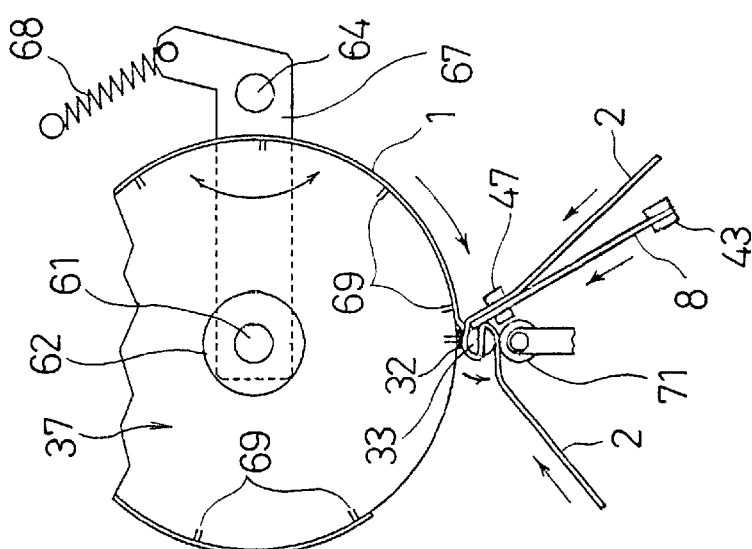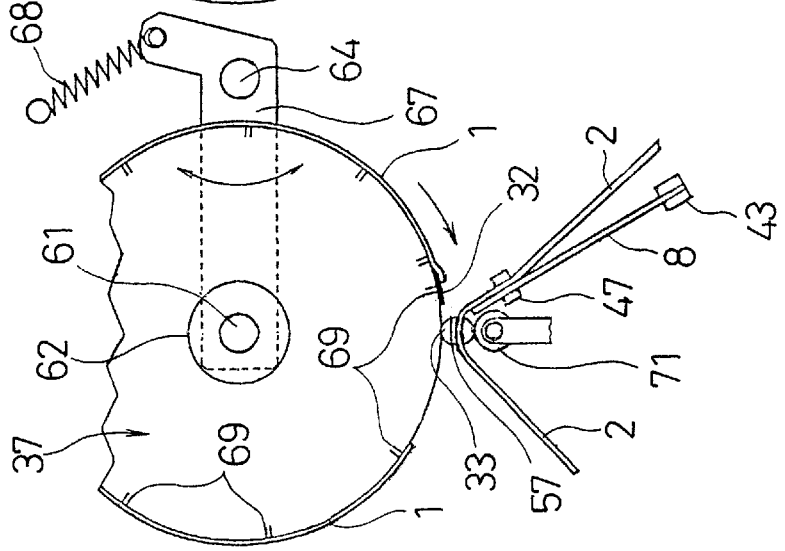

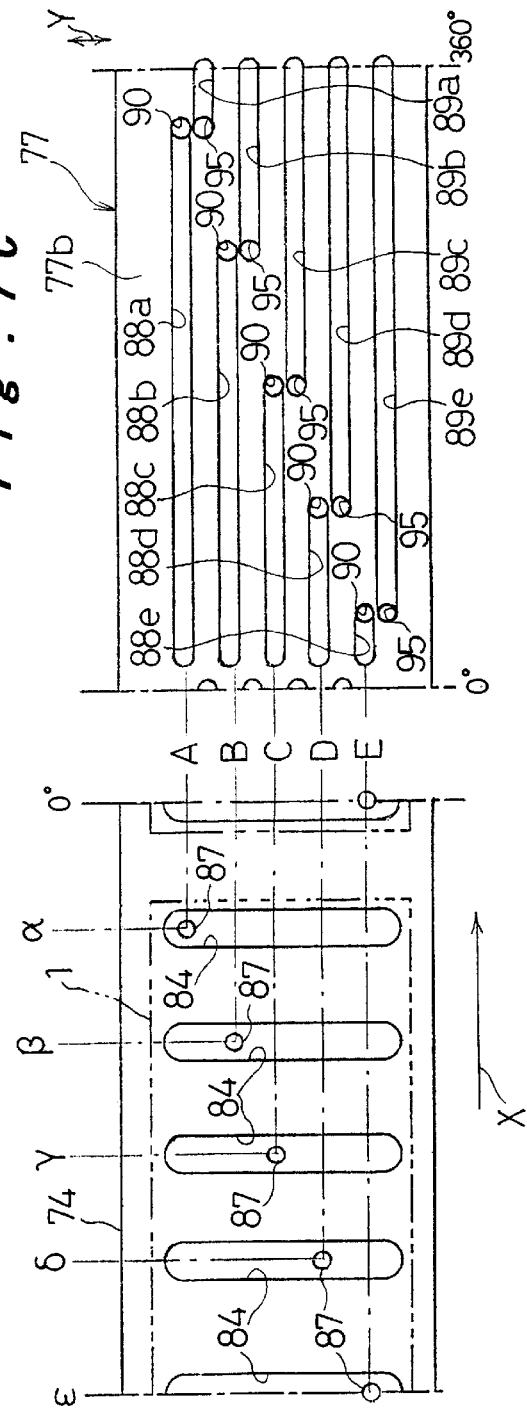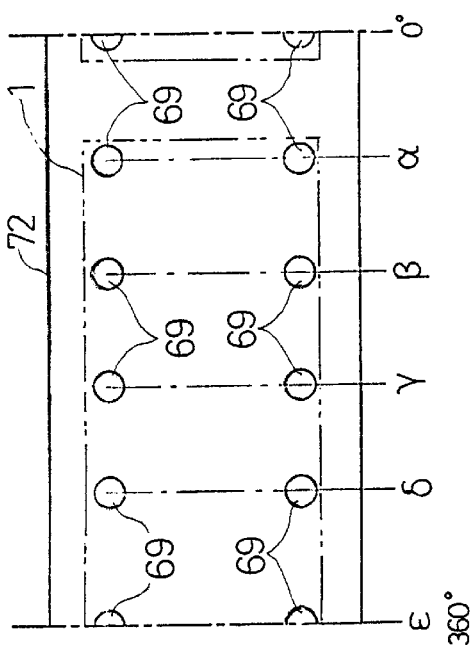

Prior Art

APPARATUS FOR MANUFACTURING SPIRAL ELECTRODE ASSEMBLY

TECHNICAL FIELD OF THE INVENTION

The present invention relates to an apparatus for manufacturing spiral electrode groups for example for a lithium battery, having a construction in which a positive electrode plate and a negative electrode plate are superimposed with a separator therebetween and wound in spiral fashion.

BACKGROUND ART

Cylindrical lithium primary batteries or various types of rechargeable batteries of small size and high capacity have long been used as the drive power sources of portable electrical equipment. As improvements in performance and function have been achieved in portable electrical equipment, such batteries are being required to have higher voltage and higher capacity; in order to satisfy such demands, batteries adopting a spiral electrode construction are now widely used, in which a positive electrode plate and a negative electrode plate are superimposed with a separator interposed between these, and wound in spiral form. With such spiral electrode groups for cylindrical batteries of various types, there are important problems to be solved in order to improve productivity and ensure high performance and uniformity of quality. Firstly, the electrode plates must be precisely aligned with each other when wound together in spiral form. Secondly, any excessive tensile force must not be applied to the electrode plates and the separator during the winding of these, or they may be expanded or deformed. On the other hand, the electrode plates and the separator must be wound tightly without any slack portion.

The present inventors have previously proposed an apparatus for manufacturing spiral electrode groups having improved performance and uniformity of quality as described above (see Laid-open Japanese Patent Application No. H9-147878). This apparatus for manufacturing spiral electrode groups will be described with reference to FIG. 10 to FIG. 12. FIG. 10 is a perspective view showing the main structural elements used for manufacturing a spiral electrode group for lithium batteries in the above apparatus. First of all, the concept of forming a strip-shaped electrode group will be described with reference to this Figure. A strip of negative electrode plate 1 is fixed on one surface (the upper surface in the drawing) of a strip of separator 2 by means of non-woven cloth 3 in a predetermined relative position with respect to the separator 2, and a positive electrode plate 8 is overlaid on the other surface (bottom surface in the drawing) of the separator 2. This strip-shaped electrode group is wound up in spiral condition, and its circumference is fixed by means of a circumferential tape 10. Prior to winding up the strip-shaped electrode group, a negative electrode lead portion 4 is mounted on the negative electrode plate 1 and a positive electrode lead portion 9 is mounted on the positive electrode plate 8, respectively.

FIGS. 11A to 11D are diagrammatic perspective views illustrating the sequence of steps of the manufacturing steps in the conventional spiral electrode group manufacturing apparatus. From its central portion S, the separator 2 is divided into a first region Q from one end thereof and a second region P from the other end thereof. The strip-shaped electrode group is formed with the negative electrode plate 1 arranged on the upper surface of one or other of the regions (in this example, the first region Q) in this separator 2 and the positive electrode plate 8 overlaid on the bottom surface thereof, respectively. In the other region P, only the separator 2 is provided.

A winding shaft 11 for winding the aforementioned strip-shaped electrode group is constituted of a winding core 12 and an auxiliary pin 13; winding core 12 is provided in its axial direction with a plurality of grooves (not shown) at its circumference, in the manner of a reamer. First of all, as shown in FIG. 11A, the winding shaft 11 comprising the winding core 12 and the auxiliary pin 13 is made to project towards the central portion S of the strip-shaped electrode group, and is rotated to start winding the strip-shaped electrode group with this central portion S being gripped by the winding core 12 and the auxiliary pin 13. At the time point where this strip-shaped electrode group has been wound a few times, as shown by the arrow in FIG. 11B, the auxiliary pin 13 is withdrawn and removed from the strip-shaped electrode group. After this, as shown in FIG. 11C, the strip-shaped electrode group is wound to completion using only the winding core 12. In this process, winding of the strip-shaped electrode group is performed whilst applying a suitable tension by suction means, to be described. Then, when winding has been completed, as shown in FIG. 11D, a circumferential tape 10 is wound around the electrode group in order to prevent it from coming loose, whereby a spiral electrode group 14 is completed.

FIG. 12 is a vertical cross-sectional view illustrating the major structural portions of the above apparatus for manufacturing spiral electrode groups. A first suction means 17 that holds the first region Q of the strip-shaped electrode group by suction and a second suction means 18 that holds the second region P of the strip-shaped electrode group by suction are arranged on both sides of the winding shaft 11. The winding shaft 11 is, as described in the foregoing, in engagement with the central portion S of the strip-shaped electrode group, and winds the separator from the central portion S thereof as being folded in two. The two suction means 17 and 18 are of identical construction. Specifically, the two suction means 17, 18 are provided with endless belts 19 that respectively attract by vacuum the corresponding regions Q, P of the strip-shaped electrode group by means of a plurality of suction holes (not shown). The endless belts 19 are fed with a desired speed by feed means, in a manner which is responsive to the increased diameter produced by the winding of the strip-shaped electrode group by the winding shaft 11. The first region Q and second region P are thereby displaced towards winding shaft 11 such that a suitable tension acts on the first region Q and the second region P of the strip-shaped electrode group that are respectively held by suction.

The feed means of the endless belt 19 comprises a cam groove 20, a rod 22 having a cam follower 21 provided at its bottom end to engage with the cam groove 20, a pinion 27 that meshes with a rack 24 at the top end of the rod 22 as the rod 22 is moved vertically along a guide 23 in accordance with the shape of the cam groove 20, a drive gear wheel 28 integral with the pinion 27, a transmission gearwheel 29 that meshes with the drive gear wheel 28, and drive rollers 30 that are rotated by the transmission gearwheel 29, causing drive rollers 30 to abut on the endless belts 19, thereby feeding and driving the endless belts 19.

With this spiral electrode group manufacturing apparatus, the first region Q and the second region P of the strip-shaped electrode group, which are respectively held by the respective endless belts 19 of the first suction means 17 and second suction means 18, are displaced towards the winding shaft 11 from both sides by the feed means. Thereby, application of excessive tension to the separator 2 and other elements constituting the strip-shaped electrode group can be prevented. The feed speed of the endless belts 19 is controlled such that this tension is the optimum, so that elongation of the separator 2 and others does not occur and occurrence of winding misalignment of the electrode plates 1, 8 is prevented.

However, it has been ascertained that there is still room for improvement in the manufacturing apparatus for a spiral electrode group as described above. With manufacturing equipment as described above, in the case of manufacturing spiral electrode groups for nickel/cadmium batteries or nickel metal hydride batteries, comparatively good spiral electrode groups can be obtained. This is because, for both of the above types of batteries, the tensile strength of the positive and negative electrode plates is comparatively large and the force of resistance to tension acting during winding of the strip-shaped electrode group is strong and furthermore both of these have an appreciable force of resistance and/or restoring force with respect to elongation of the separator, which is most liable to be subject to the effect of tension. However, when manufacturing spiral electrode groups of, for example, cylindrical lithium primary batteries, the following problems occurred.

The strip-shaped lithium metal foil tape (typically, about 0.14 mm thick and 40 mm wide) constituting the negative electrode plate 1 of a cylindrical lithium primary battery or the like has an extremely small resistance to tension, as a result of which it is readily subject to plastic deformation and easily elongates by about 1 to 2% under slight tension; it suffers a decrease in width or thickness by an amount corresponding to this elongation. It has been confirmed that such change in shape or dimensions of the spiral electrode group caused by elongation of the negative electrode plate 21 is an important cause of deterioration and/or variability of the battery characteristics.

As the strip-shaped electrode group is wound up in spiral fashion about the winding core 12, the diameter of the electrode group gradually increases. While the winding core 12 is rotated at a constant rotational speed, the feed speed of the separator 2 to which the negative electrode plate 1 is fixed and the feed speed of the positive electrode plate 8 must be increased corresponding to the increase in diameter of the electrode group. The speed with which this diameter of the electrode group increases is subtly affected by variations in the thickness of the various materials of the constituent elements of the electrode group, which are different for each battery, and by the tension acting on the separator 2. In this respect, with the manufacturing apparatus as described above, the feed speed of the endless belts 19 i.e. the feed speed of the separator 2 and the positive electrode plate 8 is set by the cam groove 20 of fixed shape, so fine adjustment of the feed speed of the separator 2 etc in accordance with variations of the rate of increase of diameter of the electrode group, which are slightly different for each battery, cannot be made. Consequently, plastic deformation such as elongation or breakage tends to occur in the lithium metal foil tape, which has extremely small resistance to tension.

Attempts have therefore been made to achieve winding of the lithium metal foil tape with the tension set so that scarcely any tension acts thereon, with the object of avoiding occurrence of any elongation at all. However, since strip-shaped lithium metal foil tape has an extremely weak surface and is liable to plastic deformation, if it is subjected to pressure or sliding in a condition in which it is in contact with metallic surfaces of various types, it easily becomes attached to such metallic surfaces. Thus it is extremely difficult to handle. The construction of the above manufacturing apparatus therefore made it impossible, whatever expedient was adopted, to wind a thin strip-shaped lithium metal foil tape securely in a condition without slackness but with no tension acting thereon. The result was that, since the winding-up force of the electrode group 14 was extremely weak, the spiral electrode group 14 that was thus produced was unstable, its shape and dimensions being easily deformed; this gave rise to the new problem of liability to winding misalignment.

Furthermore, in manufacturing equipment as described above, with the object of preventing positional misalignment of the negative electrode plate 1 and the separator 2 on winding of the strip-shaped electrode group and of preventing change of shape due to tension of the negative electrode plate 1, the negative electrode plate 1 is fixed in position to the separator 2 by interposition of non-woven cloth 3. However, since non-woven cloth 3 does not contribute anything to the electricity-generating performance of the battery, material costs are raised by the use of non-woven cloth 3 and the number of manufacturing steps is also increased by the step of sticking on non-woven cloth 3, thereby raising the cost of strip-shaped electrode group 14. Furthermore, since the volume of the spiral electrode group is increased by the non-woven cloth 3, the presence of non-woven cloth 3 constitutes an obstacle to increasing battery capacity.

In view of the above problems of the prior art, an object of the present invention is to provide an apparatus for manufacturing spiral electrode groups whereby a strip-shaped electrode group can be wound while being fed at a variable optimum speed at which no more tension than necessary is applied to the strip-shaped electrode group.

DISCLOSURE OF THE INVENTION

To achieve the above object, the present invention provides a method of manufacturing spiral electrode groups for batteries wherein a strip of positive electrode and a strip of negative electrode are overlaid upon one another with a separator therebetween and wound up in spiral form, comprising the steps of:

providing a strip of separator to a winding core such that the separator is passed through a slit formed in the winding core in an axial direction and is subjected to a predetermined amount of tension;

providing a strip of negative electrode plate made of a metal foil tape to the winding core from a tape suction drum having a rotation axis parallel to the winding core, the tape suction drum being supported rotatably around its axis and is detachably contacted with the winding core under a predetermined pressure;

driving the winding core to rotate, for causing the tape suction drum to rotate synchronously in contact with the winding core by a frictional force acting therebetween, whereby the negative electrode plate held on the tape suction drum is transferred and taken up on the winding core;

attaching a leading end of the negative electrode plate and overlapping same onto the separator at a position predetermined in relation to the separator;

feeding a positive electrode plate toward the winding core;

chucking a leading end of the positive electrode plate together with the separator at a position predetermined in relation to the separator until immediately before the positive electrode plate is taken up on the winding core; and driving the winding core to further rotate, for winding thereon the negative electrode plate, the separator (2), and the positive electrode plate in an overlapped condition.

According to the present invention, the negative electrode plate is fed toward the winding core from the tape suction drum which is rotated synchronously in contact with the winding core by the frictional force acting therebetween. Since the tape suction drum is detachably pressed against the winding drum, the feed speed of the negative electrode can be automatically increased in accordance with the increase in the diameter of the electrode group that is being wound up, i.e., the electrode plate feeding speed is automatically varied to an optimum value. Therefore, the negative electrode plate is scarcely subjected to any tension and it will not be elongated even though it consists of a thin metallic foil tape. Moreover, the negative electrode plate is positioned with respect to the separator with an adhesive patch, while the positive electrode plate is positioned with respect to the separator by a chucking member, with the result that both electrode plates are precisely aligned in relation to the separator and wound around without any slackness. A spiral electrode group having the required shape can thus be manufactured in a reliable fashion.

In the above invention, it is preferred that the negative electrode plate be fed to the tape suction drum from a tape supply drum which, when contacted with the tape suction drum, rotates synchronously in contact with the tape suction drum, whereby the negative electrode plate held on the tape supply drum is taken up on the tape suction drum, wherein the tape suction drum is provided with a plurality of vacuum suction holes on a circumferential surface thereof, each of the vacuum suction holes being activated in succession to effect vacuum suction holding of the negative electrode plate in synchronism with the taking up of the negative electrode plate on the tape suction drum, and wherein, when the negative electrode plate held on the tape suction drum is transferred and taken up on the winding core, each of the vacuum suction holes cancels the suction holding of the negative electrode plate successively in synchronism with the taking up of the negative electrode plate on the winding core.

In this way, the negative electrode plate can be securely held around the tape suction drum over the entire length without slackness, the suction holding being reliably maintained until the negative electrode plate is completely fed onto the winding core. Smooth and reliable feeding of negative electrode plate is thus accomplished.

Furthermore, to achieve the above object, the present invention provides an apparatus for manufacturing spiral electrode groups for batteries wherein a strip of positive electrode and a strip of negative electrode are overlaid upon one another with a separator therebetween and wound up in spiral form, comprising:

a winding core having a slit formed in the winding core in an axial direction through which a separator is passed;

a tape suction drum for holding by vacuum suction a strip of negative electrode plate made of a metal foil tape on a circumferential surface thereof, having a rotation axis parallel to the winding core, and being supported rotatably around its axis and is detachably contacted with the winding core under a predetermined pressure;

means for feeding a positive electrode plate toward the winding core such as to be overlapped with the separator passing through the slit of the winding core; and means for driving the winding core to rotate, for causing the tape suction drum to rotate synchronously in contact with the winding core by a frictional force acting between the negative electrode plate and one of the winding core and the separator held thereon, whereby the negative electrode plate held on the tape suction drum is transferred and taken up on the winding core, together with the positive electrode and the separator in overlapped fashion.

According to this apparatus for manufacturing spiral electrode plate groups, the tape suction drum for holding thereon a negative electrode plate by suction and transferring same onto the winding core is rotatably supported and rotated synchronously in contact with the winding core, utilizing the frictional force acting between the two. Accordingly, even though the negative electrode plate is made of a thin metal foil tape, it is subject to practically no tension at all and is not elongated, with the result that a spiral electrode plate of desired shape can reliably be obtained.

In the above invention, it is preferred that a position locating tape, which has an adhesive surface which sticks by itself to the separator held on the winding core at an instant where the tape suction drum has contacted and started to rotate with the winding core, be attached beforehand to a leading end of the negative electrode plate, and that a leading end of the positive electrode plate be chucked by a chucking member as being overlapped with the separator at a predetermined location in relation to the separator, which is passed through the slit in the winding core and subject to a predetermined tension, the chucking member being retracted to release the positive electrode plate immediately before it contacts the winding core or the electrode plate group being wound thereon.

In this way, the occurrence of positional misalignment of the positive electrode plate with respect to the separator immediately after commencement of rotation of the winding core is prevented and positional location is also obtained of the negative electrode plate that is positioned with the separator by the position locating tape. Therefore, the problem experienced with the prior art equipment that it was difficult to wind up both electrode plates precisely in predetermined relative positional relationship can be solved. Also, since the positive electrode plate is fed to the winding core with its feed direction restricted along the feed direction of the separator, winding is achieved with no possibility of positional misalignment with respect to the separator and without any slackness being produced.

The above apparatus of the present invention should preferably further comprise: a rotary support axis around which the tape suction drum is rotatably supported;

a drum support lever which is rotatable around an axis, for supporting at one end thereof the rotary support axis of the tape suction drum; and biasing means connected at the other end of the drum support lever for biasing the drum support lever in one direction such as to cause the tape suction drum to contact with the winding core under a predetermined pressure.

Thereby, since the tape suction drum is directly pressed onto the electrode group that is being wound onto the winding core by a prescribed pressure by the biasing force of the biasing means, it performs synchronous rotation in contact with this electrode group that is being wound around the winding core while tracking changes in diameter of the electrode group, being always directly pressed, by rotation through the drum support lever, onto the circumferential surface of the electrode group, which is increasing in diameter as it is wound up. Consequently, the speed of rotation of the tape suction drum is automatically increased as the diameter of the electrode group gets larger, even though the speed of rotation of the winding core is always constant, and the feed speed of the negative electrode plate is automatically increased corresponding to the speeding up of the winding up rate resulting from this increase in diameter of the electrode group. Thus variable adjustment to a stable optimum value is always automatically achieved. In this way, even in the step of winding up the electrode group, scarcely any tension is applied to the negative electrode plate made of thin metal foil tape, so there is no possibility of its being elongated.

The above apparatus of the present invention should preferably further comprise: a tape supply drum which holds thereon the negative electrode plate by suction and feeds the negative electrode plate by contacting the tape suction drum and rotates synchronously in contact therewith, wherein the tape suction drum is formed with a plurality of vacuum suction holes in a predetermined arrangement over an entire surface on which the negative electrode plate is wound, each of the vacuum suction holes being connected, in succession, to a vacuum source to effect vacuum suction holding of the negative electrode plate, concurrently as each of the vacuum suction holes is blocked by the negative electrode plate being taken up on the tape suction drum, and wherein, when the negative electrode plate held on the tape suction drum is transferred and taken up on the winding core, each of the vacuum suction holes is disconnected from the vacuum source successively, concurrently as the negative electrode plate separates from each of the vacuum suction holes.

Thereby, the plurality of vacuum suction holes that are arranged so as to be capable of applying suction to the entire surface of the negative electrode plate apply vacuum suction to the negative electrode plate successively with optimum timing, with the result that the negative electrode plate is securely held over its entire length without slackness. Since loss of vacuum suction on the negative electrode plate due to intake of atmosphere from the vacuum suction portions that are not blocked by the negative electrode plate cannot occur, the negative electrode plate can always be securely held within a prescribed range irrespective of the winding length of the negative electrode plate, even though a vacuum source of extremely small capacity is employed. When the negative electrode plate is supplied to the winding core, similarly, suction to the negative electrode plate is released with optimum timing and, since the negative electrode plate can be securely held on the tape suction drum until supply thereof to the winding core is completed, supply of the negative electrode plate to the winding core can be achieved in a smooth and reliable fashion.

The tape suction drum may be constituted by:

a rotary support axis;

a rotary section supported rotatably around the rotary support axis, having the plurality of vacuum suction holes formed on an outer circumferential surface thereof, and a guide recess formed on an inner side thereof;

a sliding section supported slidably on the rotary support axis such as to be fitted in the guide recess of the rotary section; and means for selectively locating the sliding section at a first position predetermined in relation to the rotary section and a second position predetermined in relation to the rotary section, wherein the sliding section comprises a plurality of first vacuum paths which are successively connected to each of the vacuum suction holes as rotation of the rotary section proceeds in a condition wherein the sliding section is located at the first position, and a plurality of second vacuum paths which are successively disconnected from each of the vacuum suction holes as rotation of the rotary section proceeds in a condition wherein the sliding section is located at the second position, and wherein the first and second vacuum paths are both connected to a vacuum source through an identical vacuum passage.

Thereby, simply by changing over the sliding section between the first position and the second position, the vacuum suction holes are automatically connected to the vacuum source with the timing with which they are blocked by the negative electrode plate with rotation of the rotary section, and their connection with the vacuum source is automatically cut off with the timing with which the electrode plate is separated by the rotation of the rotary section. Also, since the vacuum circuit can be made common with the exception of the changeover portion of the first and second vacuum paths, the construction can be simplified.

In the above apparatus of the present invention, it is preferred that the rotary section be provided, on an inner surface thereof which faces the sliding section, with a plurality of connection holes arranged facing to each of the plurality of vacuum suction holes in a circumferential direction and spaced apart in an axial direction, the connection holes being in constant communication with the plurality of vacuum suction holes; wherein the plurality of first vacuum paths comprise a plurality of first grooves arranged such as to face each of the connection holes in the axial direction when the sliding section is located at the first position, the plurality of grooves having gradually decreasing lengths in the circumferential direction; and wherein the plurality of second vacuum paths comprise a plurality of second grooves arranged such as to face each of the connection holes in the axial direction when the sliding section is located at the second position, the plurality of second grooves having respectively the same lengths as the gradually decreasing lengths of the plurality of first grooves in an inverse arrangement, and being disposed such that each of the first grooves and each of the second grooves are paired and arranged adjacent each other.

The tape suction drum is first located at the reference position, and then is rotated in the same direction in either case in which it takes up thereon the negative electrode plate and in which it feeds the same onto the winding core. In switching over these two operations, it is only necessary to switch over the sliding section between the first position and second position. If a construction were to be adopted in which the tape suction drum were rotated in opposite directions in the case where the negative electrode plate is held and in the case where this is supplied to the winding core, not only would the construction become complicated due to the need to provide two reference positions for positional location of the tape suction drum, but also it would not be possible to stick the position locating tape and/or circumferential tape onto both ends of the negative electrode plate, as a result of which the negative electrode plate and the separator cannot be positioned in relation to each other during the winding.

In the above apparatus of the present invention, it is preferred that the tape suction drum be fixedly located at a reference position at an instant where it is located to contact one of the tape supply drum and the winding core.

Thereby, the tape suction drum commences both winding up of the negative electrode plate onto its circumferential surface and supply of the negative electrode plate onto the winding core from a condition in which it is located in the same reference position. Accordingly, the change of relative position of the rotary section and sliding section accurately corresponds to the angle of rotation of the rotary section, and application of suction and release of suction in respect of the negative electrode plate by the vacuum suction holes can therefore be achieved precisely with the optimum timing just before their blockage by the negative electrode plate and just before their separation therefrom. As a result, no tension at all is applied to the negative electrode plate and suction holding and release can be performed extremely smoothly without production of creases.

As an alternative, the tape suction drum may be constituted by: a rotary support axis;
   a rotary section supported rotatably around the rotary support axis, having the plurality of vacuum suction holes formed on an outer circumferential surface thereof;
   a stationary section arranged on an inner side of the rotary section, allowing the rotary section to rotate therearound, wherein
   the stationary section comprises a plurality of first vacuum paths which are successively connected to each of the vacuum suction holes as rotation of the rotary section proceeds, and a plurality of second vacuum paths which are successively disconnected from each of the vacuum suction holes as rotation of the rotary section proceeds;
   a vacuum source to which the plurality of first and second vacuum paths are connected through an identical vacuum passage; and
   a switching valve for selectively connecting all of one or other of the plurality of first vacuum paths or second vacuum paths to the vacuum source through the vacuum passage.

By adopting the stationary section instead of the sliding section, the construction can be further simplified, while obtaining the same effects as described above.

The present invention also provides a non-aqueous electrolyte battery comprising a bottomed cylindrical battery case having an upper open end, a spiral electrode group fabricated by the method of manufacturing spiral electrode groups for batteries as described in the foregoing, a non-aqueous liquid electrolyte, and a sealing assembly for hermetically sealing said upper open end of the battery case.

According to this non-aqueous electrolyte battery, since the electrode plate group is wound up without using non-woven cloth as in the prior art, the number of components and manufacturing steps is remarkably decreased, whereby a considerable amount of cost can be reduced, while the battery capacity is increased by the volume previously occupied by the non-woven cloth. Also, since the negative electrode plate is wound up firmly while not being subject to elongation, whereas the positive electrode plate is precisely positioned in relation to the separator, no misalignment occurs and the winding precision is much increased. As a result, the battery according to the present invention has much improved battery performance including discharge capacities.

BRIEF DESCRIPTION OF THE DRAWINGS

FIGS. 4A to 4C are front views illustrating the manufacturing steps of a spiral electrode group by rotation of the winding core;

FIG. 7A is a diagram of the circumferential surface of the outer ring element of the tape suction drum, when laid out flat, FIG. 7B is a diagram of the circumferential surface of the rotating tube of this tape suction drum, when laid out flat, and FIG. 7C is a diagram of the circumferential surface of the sliding cylinder of this tape suction drum, when laid out flat;

BEST MODE FOR CARRYING OUT THE INVENTION

Figure 1:
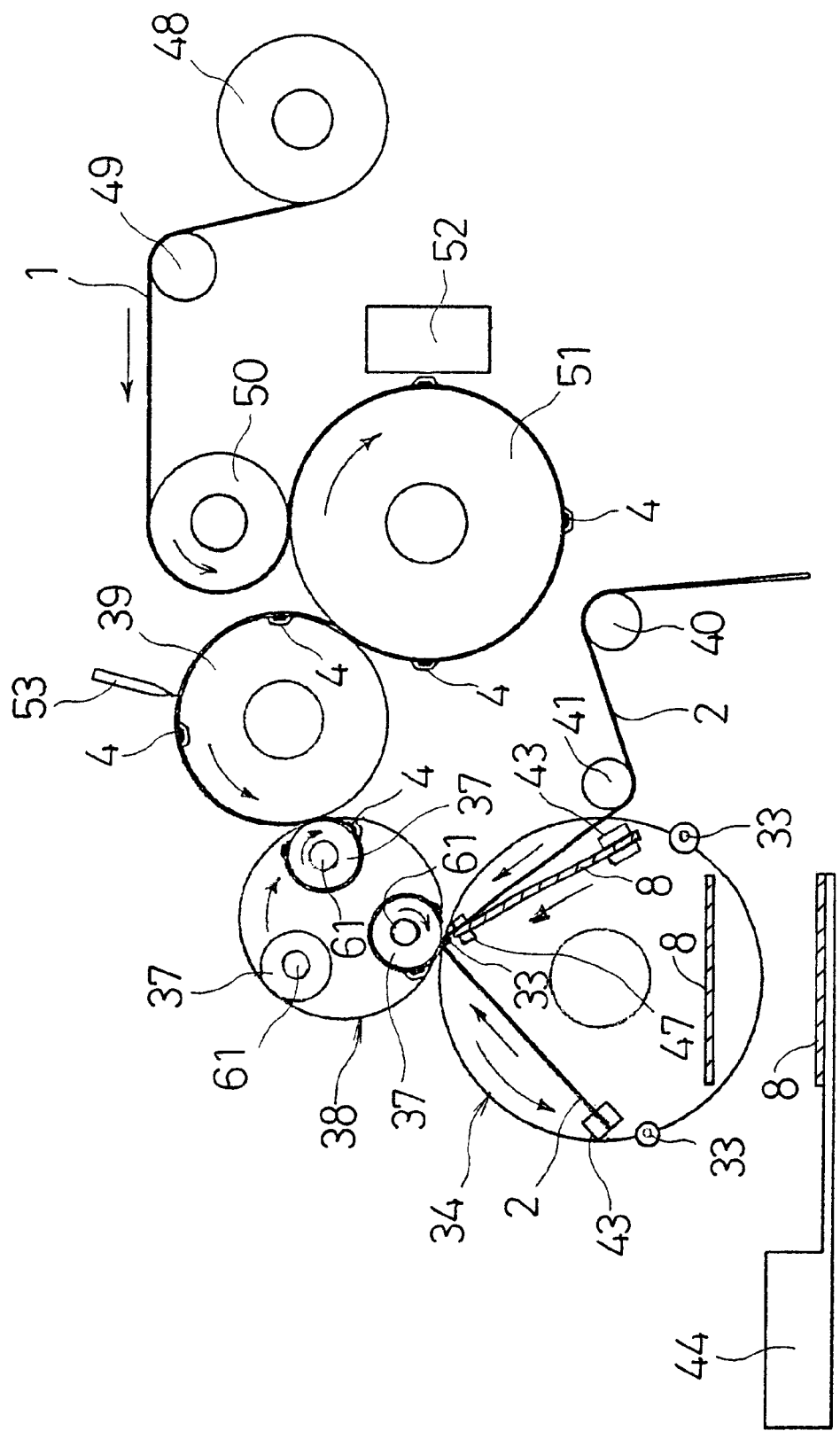
FIG. 1 is a schematic front view illustrating the entire construction of the apparatus for manufacturing spiral electrode groups according to an embodiment of the present invention.

Preferred embodiments of the present invention are described below with reference to the drawings. FIG. 1 is a schematic front view illustrating the entire construction of an apparatus for manufacturing spiral electrode groups according to an embodiment of the present invention. Before explaining this Figure, the major structural elements in the manufacture of a spiral electrode group for a lithium battery using this manufacturing apparatus will be described with reference to FIG. 8. In this spiral electrode group manufacturing apparatus, similarly to the conventional method as described in the foregoing, a strip-shaped electrode group 31 is formed by overlaying a negative electrode plate 1 made of a thin lithium metal foil tape and a positive electrode plate 8, with a separator 2 interposed between them, and this strip-shaped electrode group 31 is wound in spiral form.

Figure 10:
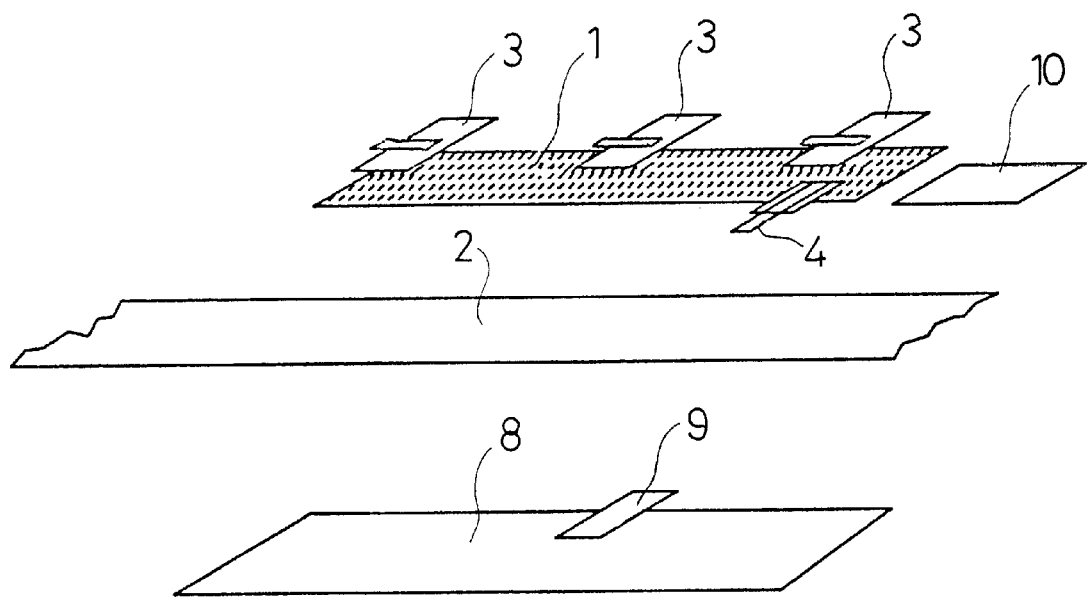
FIG. 10 is a perspective view showing major structural elements in the manufacture of a spiral electrode group for a lithium battery by a conventional apparatus for manufacturing spiral electrode groups.
Figure 11A:
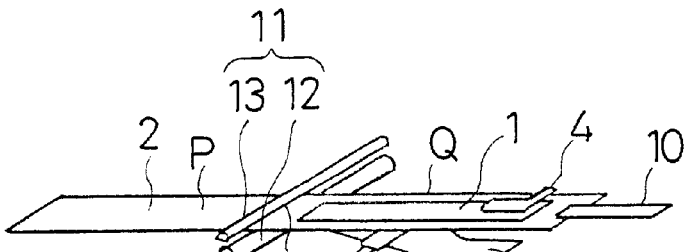
FIGS. 11A to 11D are schematic perspective views showing in step order the manufacturing steps in the conventional apparatus.
Figure 11B:
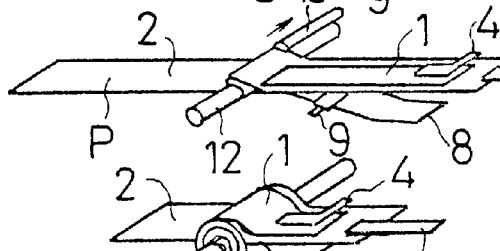
Figure 11C:
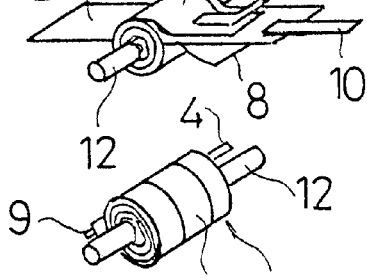
Figure 11D:
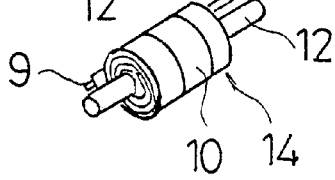
Figure 12:
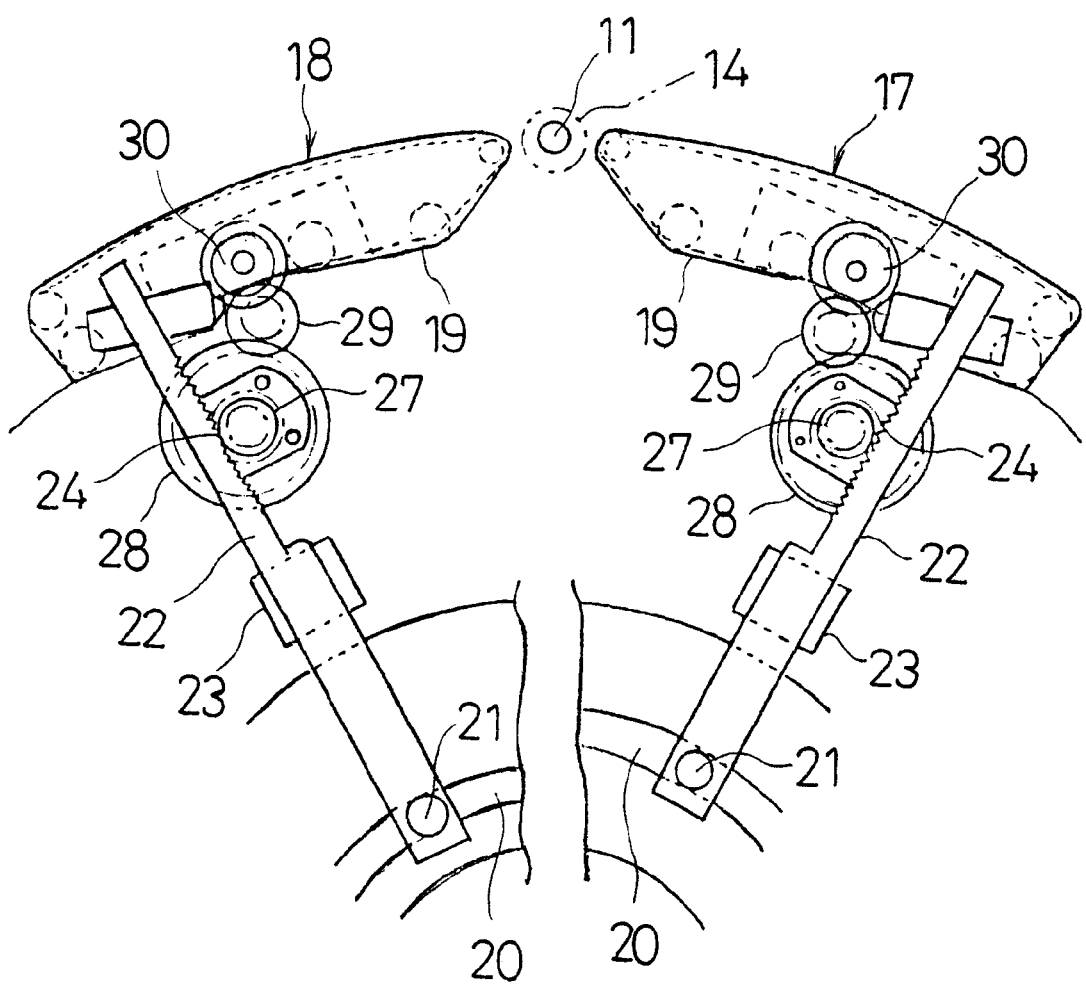
FIG. 12 is an axially sectioned view illustrating major structural parts of the conventional apparatus.

A position locating tape 32 with tacky adhesive applied to one surface (the under-surface in FIG. 8) is stuck on beforehand at one end of the negative electrode plate 1, prior to winding the strip-shaped electrode group 31. This position locating tape 32 is provided in order to locate the negative electrode plate 1 in position relative to the separator 2, but, as will be clear by comparison with FIG. 10, unlike the conventional non-woven cloth 3 of which a plurality of sheets are mounted at fixed intervals on one side of the negative electrode plate 1, only one sheet thereof is stuck on in a projecting condition at the leading end of the negative electrode plate 1. Also, a respective negative electrode lead 4 and a positive electrode lead 9 are respectively mounted beforehand prior to the winding on respective sides of the negative electrode plate 1 and the positive electrode plate 8. Furthermore, a circumferential tape 10 made of tacky adhesive tape is mounted beforehand at the rear end of the negative electrode plate 1 prior to the winding.

Next, the general arrangement of the apparatus for manufacturing spiral electrode groups according to this embodiment will be described with reference to FIG. 1. The chief constructional elements of this spiral electrode group manufacturing apparatus are: a rotary disc 34 that rotates in the direction of the arrow in the drawing, a rotary drum 38 arranged adjacent the rotary disc 34, three tape suction drums 37 arranged at the circumference of this rotary drum 38 at equal intervals of 120° such as to be freely rotatable, and a tape supply drum 39. Three winding cores 33 are arranged at the circumference of the rotary disc 34 at equal intervals of 120°. The three tape suction drums 37 arranged at the circumference of the rotary disc 34 successively supply to a winding core 33 negative electrode plates 1 held by suction at their respective circumferential surfaces. The tape supply drum 39 supplies negative electrode plates 1 of a length corresponding to the construction of one spiral electrode group to each of these tape suction drums 37. Tape suction drums 37 are not linked to a rotary drive source but are rotatably supported on respective rotary support shafts 61; however, a very light braking force is applied thereto such that they do not continue to rotate under inertial force.

In addition to the above, the spiral electrode group manufacturing apparatus comprises: guide rolls 40, 41 that guide a separator 2 onto a winding core 33; three (only two shown) guide chuck members 43 that guide the supply of a positive electrode plate 8 to the winding core 33 by moving along a guide element, to be described, whilst gripping the rear end of a positive electrode plate 8 of a length corresponding to a single spiral electrode group; a positive electrode plate supply section 44 that supplies positive electrode plates 8 cut to a predetermined length to the position where the rear end of the positive electrode plate is gripped by the guide chuck member 43; and three (only one shown) position locating chuck members 47. A detailed description of the position locating chuck members 47 is given later.

Figure 8:
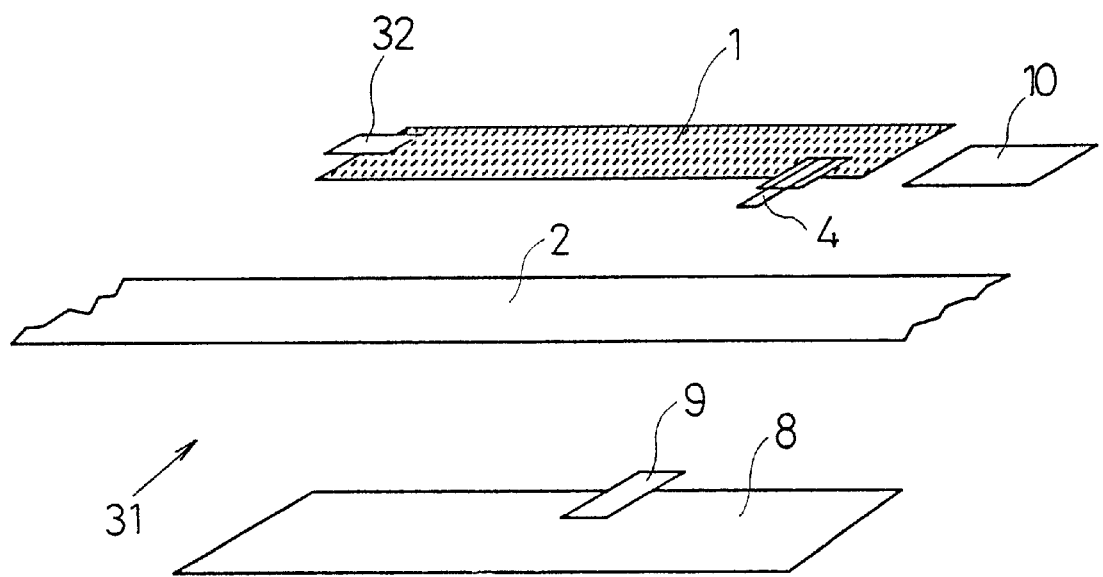
FIG. 8 is a perspective view showing the major structural elements in the manufacture of a spiral electrode group for a lithium battery by the apparatus.

Negative electrode plate 1 is paid out from a supply roll 48, and wound onto the circumferential surface of a mounting drum 51 by means of a guide roll 49 and a winding support roll 50. When the negative electrode plate 1 passes a mounting station 52 as the mounting drum 51 rotates, a position locating tape 32, a negative electrode lead 4 and a circumferential tape 10 as shown in FIG. 8 are mounted thereon. The negative electrode plate 1 is then wound onto the circumferential surface of the tape supply drum 39 from the mounting drum 51, and is cut to a prescribed length necessary for the formation of a single spiral electrode group by a cutter 53 during feeding while still wound on this tape supply drum 39.

The negative electrode plate 1 that has been thus cut to a prescribed length is successively fed to a tape supply position in the rotary drum 38. Meanwhile, the tape suction drums 37 are successively fed and positioned at the tape supply position by intermittent rotation of the rotary drum 38. The negative electrode plate 1 transferred to the tape supply position is taken up on the circumferential surface of a tape suction drum 37 that is located at the tape supply position. When the negative electrode plate 1 held on the circumferential surface of the tape suction drum 37 has been fed by intermittent rotation of the rotary feed drum 38 to a winding position where the tape suction drum 37 contacts one of the winding cores 33, it is wound around the winding core 33 in a condition laminated with a separator 2 and a positive electrode plate 8 by the rotation of the winding core 33.

Figure 2:
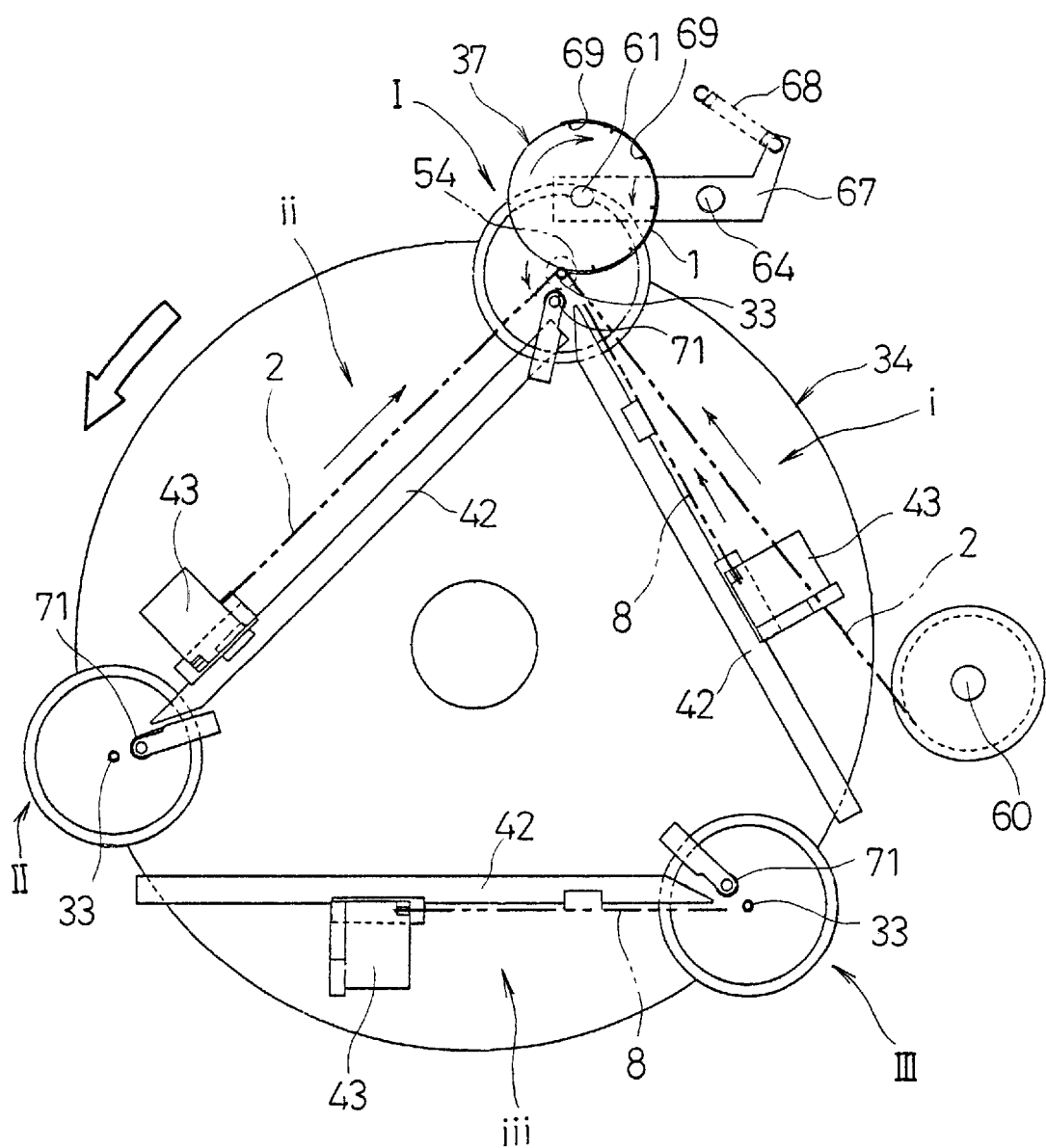
FIG. 2 is a front view to a larger scale illustrating the relative positional relationship of a rotary disc and a tape suction drum in the apparatus.

FIG. 2 is a front view to a larger scale showing the relative positional relationship of the rotary disc 34 provided with the three winding cores 33 and the tape suction drum 37. The rotary disc 34 is rotated intermittently in the direction of the arrow in the drawing at angles of 120°. Thereby, the three winding cores 33 that are arranged at equal intervals at angles of 120° at the circumference of the rotary disc 34 are successively fed into the winding position contacting the tape suction drum 37. The winding core 33 which has been located at the winding position is then driven to rotate, whereby the negative electrode plate 1 fed thereto from the tape suction drum 37 and a separator and a positive electrode plate 8 laminated thereon are wound in spiral form.

Figure 3:
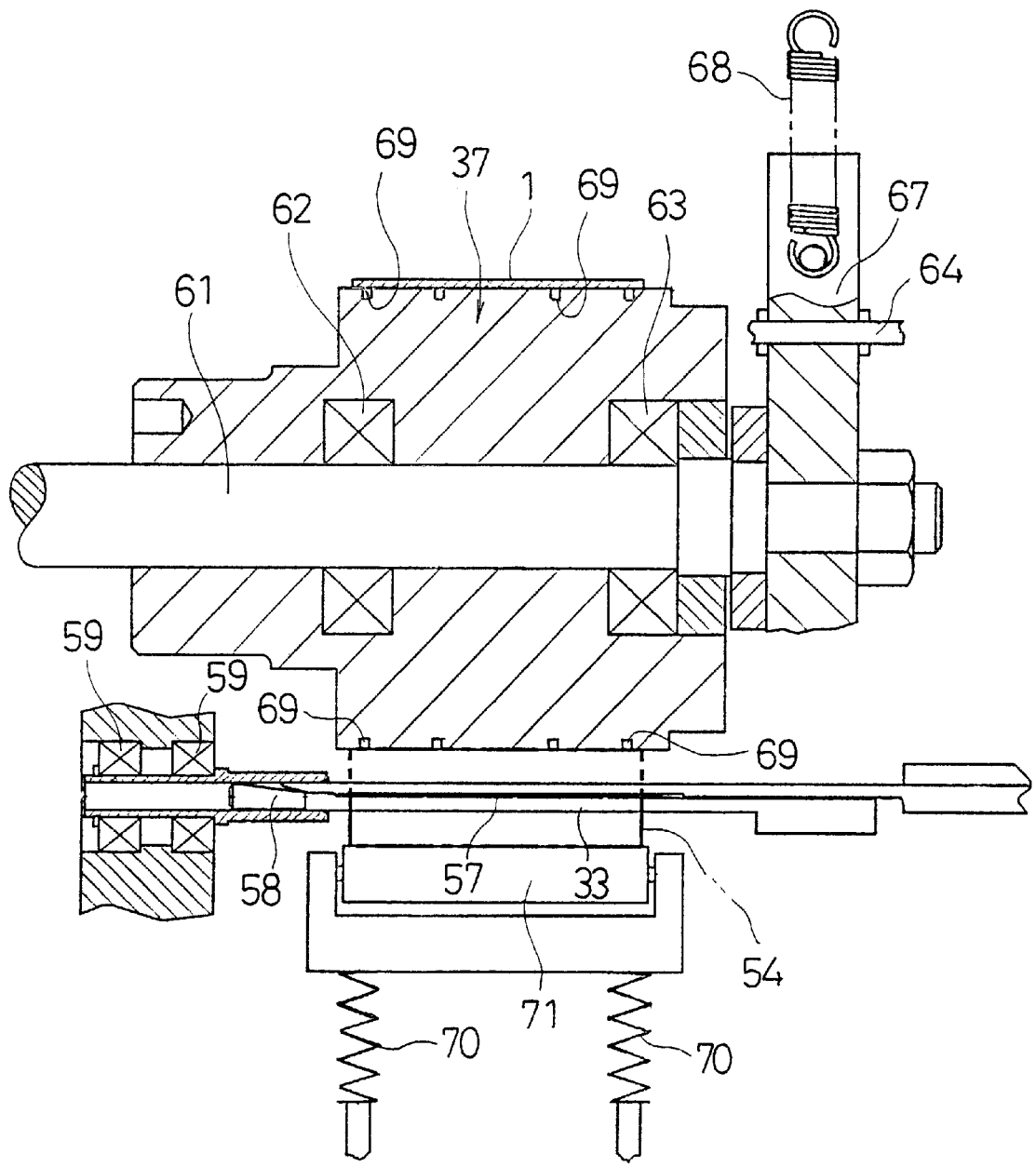
FIG. 3 is a cut-away right side view illustrating schematically the construction of a winding core and a tape suction drum in the apparatus.

FIG. 3 is a cut-away right side view showing schematically the relative positional relationship of the winding core 33 located at the winding position and the tape suction drum 37. The winding core 33 is provided with a slit 57 for purposes of engagement, parallel with the axial direction (left/right direction in the drawing) of the winding core 33. A support section 58 at the leading end (left-hand end in the drawing) of the winding core 33 is rotatably supported on a bearing 59, while the rear end (right hand end in the drawing) is connected with a rotary drive source (not shown). As shown in FIG. 2, a separator 2 is paid out from a feed roll 60, and is inserted into this engagement slit 57 of the winding core 33.

Referring to FIG. 2, respective linear guide elements 42 are arranged between each of the three winding cores 33. On these three guide elements 42, there are provided respective guide chuck members 43 and the position locating chuck members 47 shown in FIG. 1 (not shown in FIG. 2), in such a way that they are each capable of extremely smooth sliding, being subjected to scarcely any sliding load. The position locating chuck members 47 are arranged such that they can be advanced to and retracted from the guide elements 42, and they are advanced to the guide elements 42 to function only when they are located at the right-hand position i in FIG. 2. Specifically, when it comes to the right-hand position i in FIG. 2, the position locating chuck member 47 is advanced to its operating position, where it chucks the leading end of the positive electrode plate 8 that is overlapped in precise positional relationship with the separator 2, and slides on the guide element 42 towards the winding core 33 at position I. Thereby, as the separator 2 is fed and wound onto the winding core 33, the positive electrode plate 8 is also fed on to the winding core 33 in a manner in which it is precisely positioned with respect to the negative electrode plate 1. This action will be explained in detail later. It should be noted that it is not necessarily essential for the position locating chuck member 47 to be moved along the guide element 42.

When a guide chuck member 43 comes to position iii in FIG. 2 with the rotation of the rotary disc 34, it chucks the rear end of the positive electrode plate 8 that is supplied from the positive electrode plate supply section 44 shown in FIG. 1. When it comes to position i on the right-hand side in FIG. 2, the guide chuck member 43 slides upwards along the guide element 42 in response to the feeding of the positive electrode plate 8 that is fed onto the winding core 33 with the separator 2 by the position locating chuck member 47, and thereby functions as a weight applying a suitable tension to the positive electrode plate 8. When it comes to position ii on the left-hand side in FIG. 2, the guide chuck member 43 chucks the leading end of the separator 2 that has been inserted into the engagement slit 57 of the winding core 33 at position I, and is raised along the guide element 42 at position ii with the winding action by the winding core 33. Thus it functions as a weight for applying a suitable tension to the separator 2.

The tape suction drum 37 is rotatably supported on a rotary support shaft 61 by means of a pair of bearings 62, 63 as shown in FIG. 3. As best shown in FIG. 2, the rotary support shaft 61 of a tape suction drum 37 is supported in a cantilevered fashion at one end of a drum support lever 67, which is freely rockable about a lever support pin 64 as fulcrum. The drum support lever 67 is biased to rock in one direction by a coiled spring 68 suspended at the other end. The tape suction drum 37 is therefore pushed against the winding core 33 with a suitable force by means of the drum support lever 67 which is biased in rotation by the biasing force of the coiled spring 68.

Since, as described above, the tape suction drum 37 is rotatable about the rotary support shaft 61 and is rockable about the lever support pin 64 in the directions approaching and separating from the winding core 33, it revolves slightly about the lever support pin 64 to track the growth in diameter of the spiral electrode group 54 as the winding core 33 is rotated. Furthermore, a winding core support roll 71 is in light contact, biased by a compression coil spring 70, with the winding core 33 or the spiral electrode group 54 that is wound around it.

Next, the winding action of a strip-shaped electrode group 31 by the rotation of the winding core 33 will be described referring to FIGS. 4A to 4C. FIG. 4A shows the condition immediately prior to commencement of rotation of the winding core 33, immediately after insertion of a separator 2 into the engagement slit 57 of the winding core 33. At this point, the leading end of the positive electrode plate 8 is chucked by the position locating chuck member 47 in a condition in which it is aligned and overlaid in precise positional relationship with the separator 2. At the same time, the rear end of the positive electrode plate 8 is chucked by the guide chuck member 43. Therefore, the positive electrode plate 8 is prevented from being misaligned in relation to the separator 2 even immediately after the commencement of rotation of the winding core 33, and is also positioned precisely with respect to the negative electrode plate 1.

FIG. 4B shows the condition in which the winding core 33 is half-rotated in the direction of the arrow shown in the drawing from the condition shown in FIG. 4A and the tape suction drum 37, which is in contact with this winding core 33, is rotated with the winding core 33 by the frictional force between itself and the winding core 33, so that the winding operation of a strip-shaped electrode group 31 is commenced. At this point, the position locating chuck member 47 is still holding the separator 2 and the leading end of the positive electrode plate 8 overlapped thereon. The winding core support roll 71 is pushed by the biasing force of the compressed coiled spring 70 shown in FIG. 3 onto the electrode group being wound, whereby the electrode group is firmly wound without slack and also flexion of the winding core 33 is made as small as possible. A position locating tape 32 having an adhesive surface on one side thereof is attached at the leading end of the negative electrode plate 1 at the mounting station 52 shown in FIG. 1 as described above. This position locating tape 32 sticks to the separator 2 by itself when it contacts the separator 2. Therefore, the negative electrode plate 1 and the separator 2 are kept precisely aligned in position with each other in the subsequent winding step.

The tape suction drum 37 is supported rotatably about the rotary support shaft 61 by means of the bearings 62, 63, but it is not connected with a rotary drive source. Furthermore, it is pressed onto the winding core 33 or the spiral electrode group 54 wound onto the winding core 33, with a prescribed pressure by the biasing force of the coiled spring 68. Therefore, when the winding core 33 is further rotated from the condition shown in FIG. 4B, the tape suction drum 37 starts to rotate in synchronism with the winding core 33.

As the rotation proceeds, the separator 2 is wound around the winding core 33, and the negative electrode plate 1 that is held by suction on the circumferential surface of the tape suction drum 37 which is rotating in synchronism with the winding core 33 is wound in between the separator 2 as can be seen from FIG. 4B. In this process, the positive electrode plate 8 is fed towards the winding core 33 integrally with the separator 2 whilst its leading end is chucked together with the separator 2 by the position locating chuck member 47, thereby preventing positional misalignment of the positive electrode plate 8 with respect to the separator 2. The position locating chuck member 47 releases the positive electrode plate 8 immediately before the leading end of the positive electrode plate 8 makes contact with the winding core 33, and it is then retracted to one side of the guide element 42. The leading end of the negative electrode plate 1 that has been positioned in relation to the separator 2 by the position locating tape 32 and the leading end of the positive electrode plate 8 are thereby aligned in a precise relative position. Conventionally, in contrast, the timing at which the positive electrode plate was supplied towards the negative electrode plate was not controlled, and therefore, it was difficult to wind the positive and negative electrode plates together in an accurate positional relationship.

Meanwhile, the positive electrode plate 8 is fed on to the winding core 33 with its feed direction restricted, practically along the feeding direction of the separator 2, because the chuck member 43 chucking the rear end of the positive electrode plate 8 slides smoothly upwards along the guide element 42 as the separator 2 is fed, thereby applying a suitable tension to the positive electrode plate. Therefore, the positive electrode plate 8 is kept precisely positioned with respect to the separator 2, and is wound tightly without any slack portion.

FIG. 4C shows the condition immediately prior to completion of a spiral electrode group 54, in which almost all of the negative electrode plate 1 that was held by suction on the circumferential surface of the tape suction drum 34 has been wound up around the winding core 33. When all of the negative electrode plate 1 has been wound on the winding core 33, finally, the circumferential tape 10 with tacky adhesive applied to one side surface thereof is wound onto the circumferential surface of the strip-shaped electrode group 54 so as to prevent it from slacking, thereby completing the spiral electrode group 54.

As described above, the winding core 33 located at position I in FIG. 2 is driven to rotate in a condition in which the circumferential surfaces of the winding core 33 and the tape suction drum 37 are in mutual contact under predetermined pressure with their respective axes in a mutually parallel arrangement. Therefore, the tape suction drum 37 is made to rotate in synchronism with the winding core 33, utilizing the frictional force acting between the negative electrode plate 1 that is held by suction on the circumferential surface of the tape suction drum 37 and the circumferential surface of the winding core 33 or the separator 2. Consequently, scarcely any tension is applied to the negative electrode plate 1. Even though it consists of thin lithium metal foil tape, there is no possibility of its being elongated, and a spiral electrode group 54 of a desired shape can be reliably fabricated.

Also, the tape suction drum 37 that is freely rotatable about the rotary support shaft 61 is arranged by means of a drum support lever 67 such that it is freely rotatable about the lever support pin 64 as fulcrum and is directly pressed by the prescribed pressing force provided by the biasing force of the coiled spring 68 on to the spiral electrode group 54 which is wound onto the winding core 33. Therefore, the tape suction drum 37 rocks about the drum support lever 67 following the changes in diameter of the spiral electrode group 54, and rotates in synchronism with the electrode group while being always directly pressed against the circumferential surface of the spiral electrode group 54 whose diameter grows as the winding proceeds. Consequently, the rotary speed of the tape suction drum 37 is automatically increased as the diameter of the spiral electrode group 54 becomes larger, even though the rotary speed of the winding core 33 is always constant. As a result, the feed speed of the negative electrode plate 1 is automatically adjusted to a stable optimum value, being automatically variable corresponding to the increase in the winding speed as the spiral electrode group 54 becomes larger in diameter. Consequently, scarcely any tension is applied to the negative electrode plate 1 consisting of thin lithium metal foil tape even during the process of winding of the spiral electrode group 54, so there is no possibility of its being subjected to elongation.

The electrode group is wound up with a suitable firmness by the frictional force acting between the winding core 33 and the tape suction drum 37 by the pressure applied by the coiled spring 68 and the winding core support roll 71. Thus there is scarcely any possibility of depressions being produced in the negative electrode plate 1 or of this being reduced in thickness beyond the desired value by excessive pressure acting thereto during the winding of the spiral electrode group 54.

The tape suction drum 37 has the function to securely hold the entire surface of the negative electrode plate 1 without slackness after the negative electrode plate 1 is supplied from the tape supply drum 39 shown FIG. 1, and to release the negative electrode plate smoothly when feeding it onto the winding core 33. Specifically, the tape suction drum 37 is provided with a plurality of vacuum suction holes 69 on the circumferential surface thereof over an area corresponding to a negative electrode plate 1, and these vacuum suction holes 69 are sequentially connected with a vacuum source when the tape suction drum 37 receives the negative electrode plate 1 from the tape supply drum 39, and when the negative electrode plate 1 is supplied to the winding core 33, the vacuum suction holding of the negative electrode plate 1 by the vacuum suction holes 69 is sequentially cancelled as the negative electrode plate 1 separates from the tape suction drum 37, so that it is smoothly taken up on the winding core 33.

Figure 5:
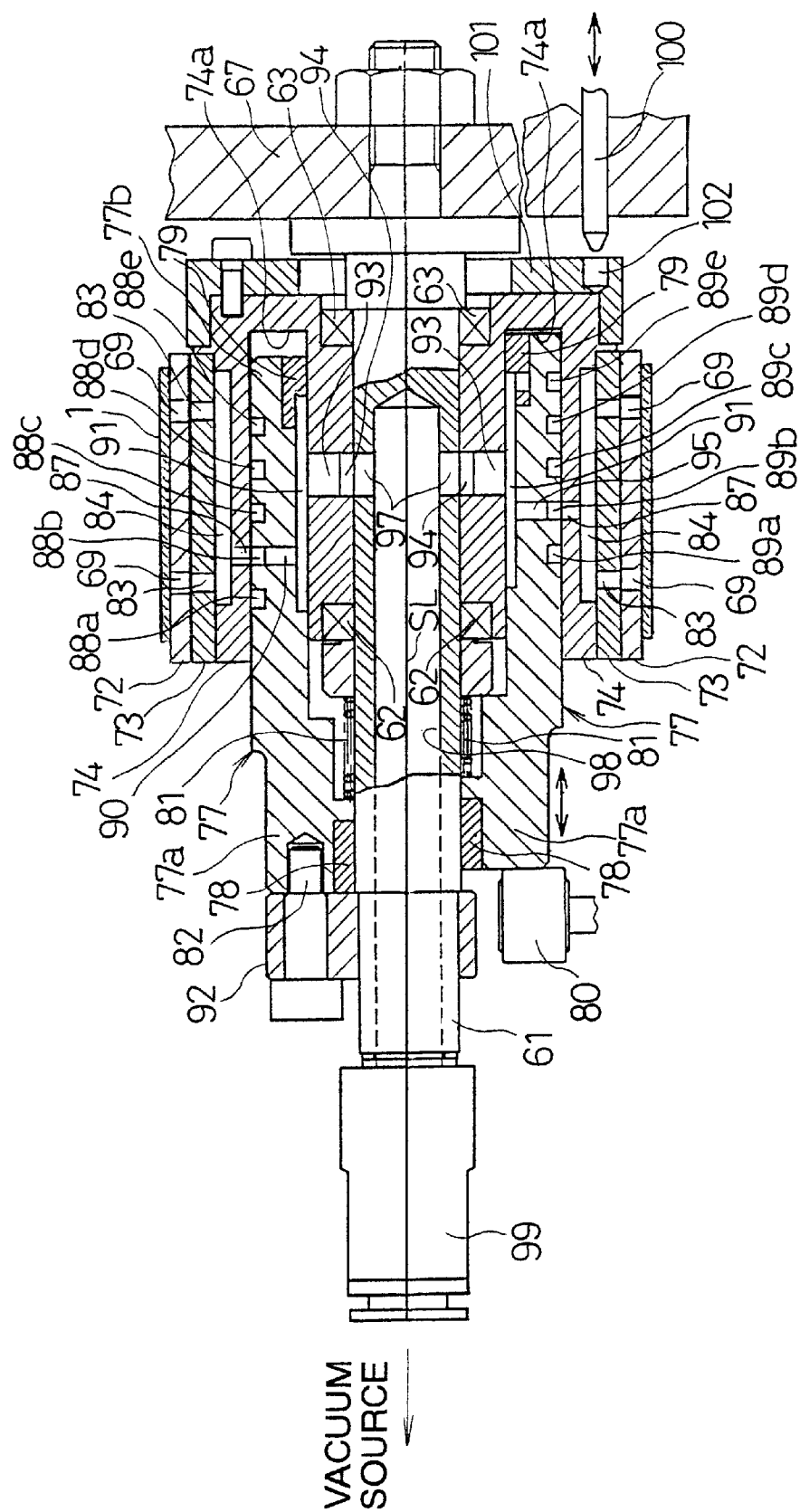
FIG. 5 is a cut-away right side view illustrating in detail the internal structure of the tape suction drum in the apparatus.

The detailed construction of a tape suction drum 37 equipped with the above function will be described with reference to FIG. 5 to FIG. 7. FIG. 5 is a cross sectional right side view illustrating in detail the internal structure of the tape suction drum 37. The drawing shows different conditions above and below a center line SL, which will be explained later. A rotary tube 74 is rotatably supported on the rotary support shaft 61 by means of bearings 62, 63. On the outer circumferential surface of this rotary tube 74, there are externally fitted and fixed an outer ring element 72 made of polyurethane rubber or the like on which negative electrode plates 1 can be securely wound and an inner ring element 73 made of metal for reinforcing this outer ring element 72. The outer ring element 72, the ring element 73 and the rotary tube 74 which constitute rotary portions in this tape suction drum 37 are held on the rotary support shaft 61 and are of a construction permitting light, smooth rotation when subjected to slight rotational force. In this way no tension is applied to a negative electrode plate 1 when this is wound on the outer circumferential surface of the outer ring element 72 as described above.

A sliding cylinder 77 comprises a small diameter section 77a at its front end (left end in the Figure) and a larger diameter section 77b at its rear side (right side in the Figure). The small diameter section 77a is slidably supported on the rotary support shaft 61 through a sliding member 78 such as a sleeve, and the large diameter section 77b is slidably supported on the rotary tube 74 by means of a sliding member 79 within a guide recess 74a provided in circular cross-sectional shape on the front face side (left face side in the Figure) in the middle part of the rotary tube 74.

The sliding cylinder 77 is arranged to be located alternatively in one of two predetermined positions in the axial direction of the rotary support shaft 61 by the biasing force of a compression spring 81 and the rotation of an eccentric actuating roll 80. Specifically, FIG. 5 shows respectively in the part of the Figure above the center line SL of the tape suction drum 37 the condition in which the sliding cylinder 77 is located in a first position at the front face side (left side in the Figure) by the biasing force of the compression spring 81, while the part of the Figure below the center line SL shows the condition in which the sliding cylinder 77 is located in a second position on the rear side (right side in Figure) against the biasing force of the compression spring 81 by the pressing force provided by the rotation of the eccentric actuating roll 80.

When a negative electrode plate 1 is being received from the tape supply drum 39, the sliding cylinder 77 is located in the first position, and when the negative electrode plate 1 is being supplied to the winding core 33, it is located in the second position. The sliding cylinder 77 is moved linearly selectively to these two positions along the rotary support shaft 61, but is restrained so that it cannot rotate with respect to the rotary support shaft 61 by means of a rotation-preventing pin 82 mounted on a fixed member 92 which is fitted externally and fixed to the rotary support shaft 61.

In the outer ring element 72 that is positioned at the outermost circumference of the tape suction drum 37, there are provided a plurality of vacuum suction holes 69, also shown in FIG. 3. These vacuum suction holes 69 are provided in a suitable arrangement and number to enable the entire surface of the negative electrode plate 1 to be reliably held by suction without slackness at the location where negative electrode plate 1 is wound onto the circumferential surface of the outer ring element 72. The arrangement of these vacuum suction holes 69 is described in detail later with reference to FIGS. 7A to 7C.

The vacuum suction holes 69 of the outer ring element 72 are connected to a vacuum source (not shown) such as a vacuum pump through a vacuum circuit provided within the tape suction drum 37. In the vacuum circuit, a plurality of paths that communicate the outer ring element 72 with the rotary tube 74 are constituted by: communicating holes 83 provided in the inner ring element 73 in an arrangement communicating with and respectively coincident with the aforesaid vacuum suction holes 69; communicating grooves 84 communicating with the communicating holes 83 and extending in the axial direction of the rotary tube 74 with a length corresponding to the width of the negative electrode plate 1 in the circumferential surface of the rotary tube 74; and connection holes 87 communicating with the communicating grooves 84 and extending in the radial direction of the rotary tube 74 into the guide recess 74a in the rotary tube 74. The paths from these vacuum suction holes 69 to the connection holes 87 are in constant communication with each other.

In the vacuum circuit, furthermore, a plurality of paths are formed in the large diameter section 77b of the sliding cylinder 77, comprising: a plurality (five are illustrated by way of example in this embodiment) of suction timing setting grooves 88a to 88e and a plurality (five are illustrated by way of example in this embodiment) of release timing setting grooves 89a to 89e; five coupling holes 90, 95 respectively communicating with these individual grooves 88a to 88e and 89a to 89e; and a wide ring-shaped groove 91 that communicates with both of the coupling holes 90 of the suction timing setting grooves 88a to 88e and the coupling holes 95 of the release timing setting grooves 89a to 89e. When the sliding cylinder 77 is located in the first position, as shown above the center line SL, the suction timing setting grooves 88a to 88e communicate respectively with the connection holes 87 of the rotary tube 74, and when the sliding cylinder 77 is located in the second position as shown below the center line SL, the release timing setting grooves 89a to 89e are respectively connected with the connection holes 87. The arrangement of these communicating paths will be described in detail later with reference to FIGS. 7A to 7C.

Furthermore, the vacuum circuit also includes a plurality of paths that communicate the interior of the guide recess 74a in the rotary tube 74 with an air coupling 99, provided on the vacuum source side, comprising: communicating holes 93 that communicate with the wide ring-shaped groove 91 of the sliding cylinder 77 formed in the radial direction of the rotary tube 74 at a location on the inner side of the guide recess 74a in the rotary tube 74, communicating grooves 94 formed in circular shape in the circumferential direction communicating with these communicating holes 93, communicating holes 97 formed in the radial direction of the rotary support shaft 61 in an arrangement communicating with the communicating grooves 94, and a central hole 98 formed along the axis in the center of the rotary support shaft 61 communicating with these communicating holes 97 and the air coupling 99. These paths from the wide ring-shaped groove 91 to the air coupling 99 are in constant communication with each other irrespective of the position of the sliding cylinder 77.

Figure 6:
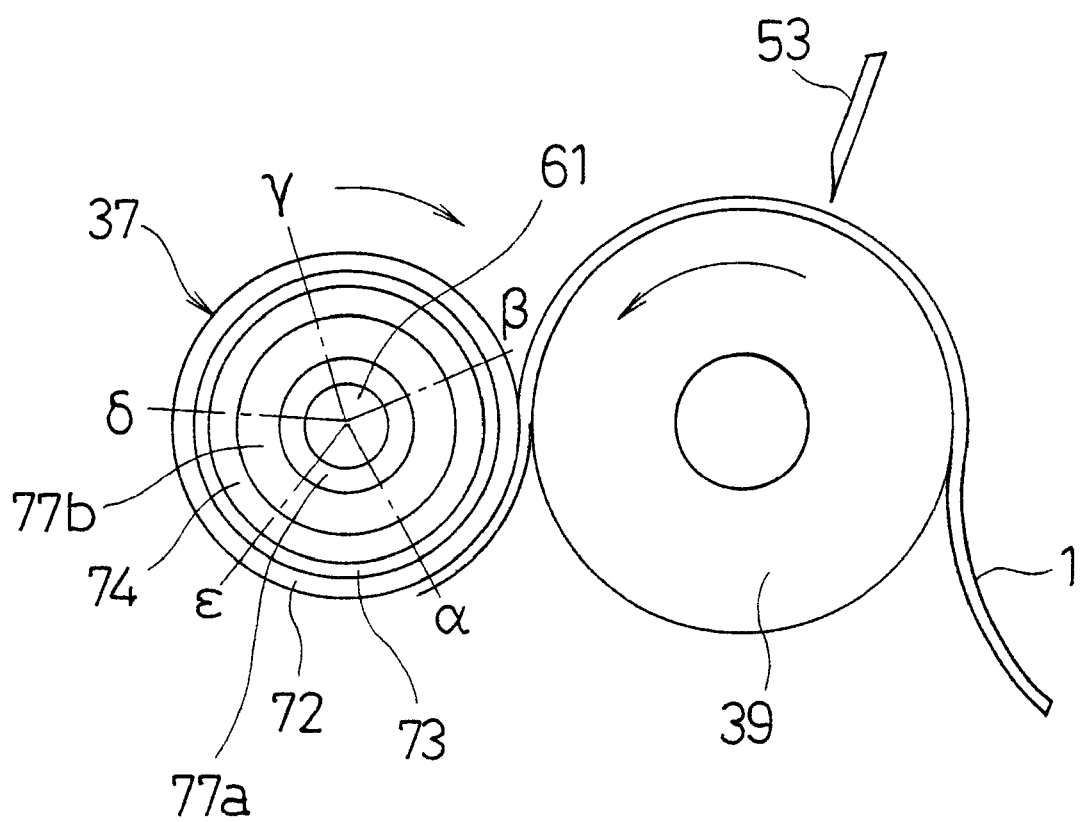
FIG. 6 is a front view to a larger scale illustrating the tape suction drum and a tape supply drum in the apparatus.

Now, as shown in FIG. 6, let the position where the vicinity of the leading end of a negative electrode plate 1 is wound onto the tape suction drum 37 be a, positions successively separated by fixed angles from this position a be β, γ, δ and the position where the end of the negative electrode plate 1 is wound be ε. These positions α, β, γ, δ, and ε conform in position to the vacuum suction holes 69.

FIG. 7A is a diagram viewed from the circumferential surface of the outer ring element 72, when laid out flat, FIG. 7B is a diagram viewed from the circumferential surface of the rotating tube 74 that rotates integrally with the outer ring element 72, when laid out flat, and FIG. 7C is a diagram viewed from the circumferential surface of the sliding cylinder 77, when laid out flat. These FIGS. 7A to 7C illustrate the relative positional relationship of the vacuum suction holes 69 of the outer ring element 72, the communication grooves 84 and the connection holes 87 of the rotary tube 74, the suction timing setting grooves 88a to 88e, the release timing setting grooves 89a to 89e, and their respective coupling holes 90, 95 of the sliding cylinder 77.

As shown in FIG. 7A, the length of the circumferential surface of the outer ring element 72 is set to be somewhat larger than the length of the negative electrode plate 1 shown by the double-dotted chain line and the width of the circumferential surface is set to be somewhat longer than the width of the negative electrode plate 1. A plurality of the vacuum suction holes 69 are formed in the outer ring element 72 in positions separated by suitable intervals in the circumferential direction along each position respectively slightly inwards of both boundaries in the width direction of the locations where the negative electrode plate 1 is wound on (for example at positions 3 to 5 mm inwards of the two boundaries).

When a negative electrode plate 1 that is supplied from the tape suction drum 39 is wound on this tape suction drum 37, the number of the plurality of suction holes 69 of outer ring element 72 that are connected with the vacuum source through the vacuum circuit is increased as the length of the negative electrode plate 1 that is wound on increases. At the time when the entire length of the negative electrode plate 1 of length corresponding to a single spiral electrode group 54 has been wound onto the outer ring element 72, the vacuum suction holes 69 are facing substantially the entire surface of the negative electrode plate 1 in a practically uniform arrangement, whereby the negative electrode plate 1 is securely held on the outer circumferential surface of the outer ring element 72 without any slackness and/or creasing. It should be noted that if the vacuum suction holes 69 are altered to the shape of slots extending in the axial direction (vertical direction in FIG. 7) of the outer ring element 72, even more reliable suction holding can be achieved due to the action of even stronger suction on the negative electrode plate 1.

The vacuum suction holes 69 of the outer ring element 72 and the communicating holes 83 of the inner ring element 73 are of the same hole diameter (for example diameter about 3 to 4 mm), and the two ring elements 72, 73 are fixed so that these holes are in mutually coincident positional relationship. That is, the communicating holes 83 of the inner ring element 73 are provided simply for the purpose of communicating the vacuum suction holes 69 of the outer ring element 72 with the communicating grooves 84 of the rotary tube 74.

As described with reference to FIG. 6, the aforementioned vacuum suction holes 69 are respectively arranged at positions α, β, γ, δ, and ε in the circumferential direction from a reference position at the reference angle of 0°. As shown in FIG. 7B, a plurality of (five are illustrated by way of example in this embodiment) elongate communicating grooves 84 extending in the axial direction of the rotary tube 74 are formed on the opposite side of the guide recess 74a in an arrangement coinciding with the positions α, β, γ, δ, and ε of the vacuum suction holes 69, and connection holes 87 respectively communicating with these communicating grooves 84 are formed in the radial direction of the rotary tube 74. The five connection holes 87 are formed in positions of arrangement A, B, C, D, and E that are successively dislocated in the circumferential direction and spaced at fixed interval in the axial direction (vertical direction in FIG. 7B) of the rotary tube 74.

In the large diameter section 77b of the sliding cylinder 77, there are arranged five suction timing setting grooves 88a to 88e whose lengths are successively shorter in a stepwise fashion by a fixed length and which constitute slots extending along the circumferential direction of the sliding cylinder, in positions coincident with the positions of arrangement A, B, C, D, and E of the connecting holes 87 in the axial direction (vertical direction in FIG. 7C) of the sliding cylinder 77. Between and on one outer side of these suction timing setting grooves 88a to 88e, five release timing setting grooves 89a to 89e of respectively the same shape as the suction timing setting grooves 88a to 88e are arranged with the same separation as the suction timing setting grooves 88a to 88e and in an arrangement with their length in inverse relationship with the suction timing setting grooves 88a to 88e. Five pairs of these suction timing setting grooves 88a to 88e and release timing setting grooves 89a to 89e are thus provided, mutually adjacent ones of each of these constituting a pair. Also, coupling holes 90, 95 respectively communicating with the grooves 88a to 88e and 89a to 89e are formed in the same positions in the circumferential direction at every two of these that constitute a pair, of the suction timing setting grooves 88a to 88e and the release timing setting grooves 89a to 89e.

Thus, when the sliding cylinder 77 is located in the first position by sliding on the rotary support shaft 61 and the rotary tube 74, the suction timing setting grooves 88a to 88e face the connection holes 87 of the rotary tube 74, while, when it is located in the second position, the release timing setting grooves 89a to 89e face the connection holes 87 of the rotary tube 74. The longest grooves 88a and 89e of the two grooves 88a to 88e and 89a to 89e have a length such that they are capable of providing suction over the entire length of the negative electrode plate 1, while the groove lengths of the grooves 88b to 88e and 89a to 89d other than these are set to a fixed value such that the sum of the groove lengths of each pair of these is capable of holding the entire length of the negative electrode plate 1.

As shown in FIG. 5, a reference position locating pin 100 is freely slidably provided on the drum support lever 67. When the reference position locating pin 100 engages with a reference position locating hole 102 formed on the end plate 101 which is fixed on the rotary tube 74, the tape suction drum 37 is located and fixed at the reference position indicated in FIGS. 7A to 7C by angle 0° and, when the reference position locating pin 100 retracts from the reference position locating hole 102, the tape suction drum 37 is put in rotatable condition.

Next, the action of increasing or decreasing the number of the vacuum suction holes 69 that are connected to the vacuum source in response to the angle of rotation of the outer ring element 72 will be described. The rotary feed drum 38 shown in FIG. 1 is rotated to and paused at a position where two of the three tape suction drums 37 respectively contact the tape supply drum 39 and the winding core 33, in a condition in which the tape suction drum 37 is fixed in the reference position (0° position in FIGS. 7A to 7C) by means of the reference position locating pin 100 being fitted into the reference position locating hole 102.

Meanwhile, vacuum suction is applied to the tape supply drum 39, irrespective of its rotational position, over the range from the position where it takes up a negative electrode plate 1 from the mounting drum 51 to the position where it supplies the negative electrode plate 1 to the tape suction drum 37, so that the negative electrode plate 1 can be held within this range, whereas in other ranges no suction acts on the tape supply drum 39.

When the negative electrode plate 1 held on the tape supply drum 39 is fed into a supply position, its leading end contacts the tape suction drum 37 and is attracted by vacuum suction to the vacuum suction holes 69 at position a of the outer ring element 72 on the tape suction drum 37 which is fixed in the reference position by the engagement of the reference position locating pin 100 with the reference position locating hole 102. At the same time, the reference position locating pin 100 is withdrawn from the reference position locating hole 102, allowing the tape suction drum 37 to be freely rotatable. Thereby, due to the frictional force acting between the two drums 37 and 39 through the negative electrode plate 1, the tape suction drum 37 commences synchronous rotation with the tape supply drum 39, causing the negative electrode plate 1 to be transferred from the tape supply drum 39 to the outer circumferential surface of the outer ring element 72 of the tape suction drum 37 and to be wound thereon.

When the negative electrode plate 1 is wound on the tape suction drum 37, the outer ring element 72, the inner ring element 73 and the rotary tube 74 are rotated in unitary fashion with respect to the sliding cylinder 77 which does not rotate. Accordingly, the relative position of the rotary tube 74 and the sliding cylinder 77 changes from the condition in which the respective reference positions 0° of the rotary tube 74 and the sliding cylinder 77 in FIGS. 7B and 7C coincide, to the condition in which the rotary tube 74 of FIG. 7B is displaced in the rightwards direction in the drawing with respect to the sliding cylinder 77 of FIG. 7C, being thereby brought into overlap therewith. Thereupon, at the time point where the leading end of the negative electrode plate 1 has come into contact with the circumferential surface of the outer ring element 72, the connection hole 87 at position a on the rotary tube 74 is in coincidence with the left-hand end in FIG. 7C of the longest suction timing setting groove 88a, which is provided at position A on the sliding cylinder 77. In this way, the two vacuum suction holes 69 at position a of the outer ring element 72 are connected with the vacuum source through the vacuum circuit described above, so that both sides of the leading end of the negative electrode plate 1 are attached on the outer ring element 72 by vacuum suction.

As the outer ring element 72, the inner ring element 73, and the rotary tube 74 continue to rotate synchronously with the rotation of the tape supply drum 69, the length of the negative electrode plate 1 that is wound onto the outer ring element 72 gradually increases. The longest suction timing setting groove 88a of the sliding cylinder 77 ensures that the vacuum suction function in respect of vacuum suction holes 69 at position a is maintained until the entire length of the negative electrode plate 1 has been completely wound onto the outer ring element 72. With the continued rotation of the outer ring element 72, the respective connection holes 87 of the communication grooves 84 at positions β, γ, δ and ε of the rotary tube 74 are successively brought into coincidence with the first grooves 88b to 88e at positions B, C, D, and E on the sliding cylinder 77.

Thus, the vacuum suction holes 69 at positions of α, β, γ, δ, and ε of the outer ring element 72 are connected with the vacuum source through the vacuum circuit described above with the timing with which they are blocked by the negative electrode plate 1 which is being wound on; the negative electrode plate 1 is therefore subjected to successive vacuum suction holding with the optimum timing. Accordingly, the negative electrode plate 1 is securely held in its wound-on condition on the outer circumferential surface of the outer ring element 72 over its entire length without slackness.

As described above, the vacuum suction holes 69 are automatically brought into connection with the vacuum circuit by successive coincidence of the mutually corresponding connection holes 87 and the suction timing setting grooves 88a to 88e at the timing with which they are blocked by the negative electrode plate 1 as it is being wound on whilst the tape suction drum 37 rotates. Therefore, it does not happen that the vacuum suction is dropped due to intake of atmosphere through vacuum suction holes that are not blocked by the negative electrode plate 1. Also, according to the present invention, since the vacuum suction holes 69 are successively automatically brought into connection with the vacuum source through the same vacuum circuit as the tape suction drum 37 rotates, its construction is greatly simplified as compared with a case where, for example, all of the vacuum suction holes are connected to the vacuum source through respective individual vacuum circuits and these vacuum circuits are changed over to successive connection conditions as the tape suction drum rotates.

If the vacuum suction were applied from the vacuum source to all of the vacuum suction holes 69, these being open to the atmosphere, the suction would be greatly reduced by the presence of vacuum suction holes 69 open to the atmosphere, with the result that the negative electrode plate 1 cannot be held and wound on the tape suction drum 37. Or, a vacuum source of extremely large capacity would necessary in order to wind a negative electrode plate 1 securely on to the tape suction drum 37 using such means. In contrast, with the tape suction drum 37 according to the present invention, the negative electrode plate can always be securely held on the tape suction drum 37 by vacuum suction within a predetermined permissible range, with a vacuum pump of small capacity, irrespective of the length of the negative electrode plate 1.

When the tape suction drum 37 is transferred to a position contacting the winding core 33 by the rotation of the rotary feed drum 38, the negative electrode plate 1 is supplied onto the winding core 33. This operation will now be described. When the suction holding of the negative electrode plate 1 that is supplied from the tape supply drum 39 by the tape suction drum 37 is completed, the reference position locating pin 100 is engaged with the reference position locating hole 102 to fix the tape suction drum 37 at the reference position. At the same time, the eccentric actuating roll 80 is rotated through a predetermined angle, so that the sliding cylinder 77 is moved to the second position shown below the center line SL in FIG. 5 against the biasing force of the compression spring 81. In this way, the rotary tube 74 and the sliding cylinder 77 are positioned relative to each other such that the five respective connecting holes 87 of the rotary tube 74 coincide with the corresponding release timing setting grooves 89a to 89e of the sliding cylinder 77. In this process, the vacuum circuit connecting the vacuum suction holes 69 and the vacuum source is merely changed over so that the vacuum suction holes 69 are connected through the release timing setting grooves 89a to 89e instead of through the suction timing setting grooves 88a to 88e, and therefore all of the vacuum suction holes 69 are maintained in a condition connected to the vacuum source. Thus the negative electrode plate 1 is kept attached on the outer ring element 72 over its entire length.

Now that the tape suction drum 37 holding thereon the negative electrode plate 1 contacts the winding core 33, it rotates synchronously with the winding core 33 due to the frictional force acting between the winding core 33 and the outer ring element 72. At the time when the tape suction drum 37 has begun to rotate, the position locating tape 32 that has been attached to the leading end of the negative electrode plate 1 adheres onto the separator 2 by itself when it contacts the separator 2. As described in the foregoing with reference to FIG. 4, the negative electrode plate 1 is thereby wound onto the winding core 33 together with the separator 2.

At the time point where the tape suction drum 37 starts rotation at the position contacting the winding core 33, the connecting hole 87 at position a corresponding to the winding position of the leading end of the negative electrode plate 1 on the rotary tube 74 coincides and communicates with the right hand end in FIG. 7C of the shortest release timing setting groove 89a of the sliding cylinder 77. That is, since the sliding cylinder 77 has been slid into the second position shown in FIG. 5, its position being displaced upwards in the direction indicated by the arrow Y in FIG. 7C, the relative positions of the rotary tube 74 and the sliding cylinder 77 are now such that the connecting holes 87 of the rotary tube 74 coincide respectively with the release timing setting grooves 89a to 89e. In this state, as shown by the arrows in FIG. 1, the tape suction drum 37 rotates in synchronism with the winding core 33 in the same direction as the direction in which it rotated with the tape supply drum 39. That is, the rotary tube 74 of the tape suction drum 37 is rotated in the direction of the arrow X of FIG. 7B with respect to the sliding cylinder 77. Therefore, at a time point where the tape suction drum 37 has been rotated slightly by the winding core 33, the connecting hole 87 at position a moves away from the shortest release timing setting grooves 89a, with the result that the two vacuum suction holes 69 at position a lose the suction on both sides of the leading end of the negative electrode plate 1. Similarly, the connecting holes 87 at positions β, γ, δ and ε successively move away from the corresponding release timing setting grooves 89b to 89e as the tape suction drum 37 rotates, as a result of which each two vacuum suction holes 69 at positions β, γ, δ and ε successively lose the vacuum suction to the negative electrode plate 1.

Consequently, the negative electrode plate 1 wound on the tape suction drum 37 is successively released from its leading end from the vacuum suction holding. While it is smoothly peeled away from the outer circumferential surface of the outer ring element 72, the negative electrode plate 1 is wound onto the winding core 33. As mentioned above, the tape suction drum 37 is first located at the reference position by the engagement of the reference position locating pin 100 with the reference position locating hole 102 before starting to feed the negative electrode plate 1, and the relative positions of the rotary tube 74 and the sliding cylinder 77 are changed from this condition as the rotation proceeds. Therefore, the suction holding of the negative electrode plate 1 by the vacuum suction holes 69 is released with optimal timing just before the respectively corresponding portions of the negative electrode plate 1 are wound onto the winding core 33, whereby the negative electrode plate 1 is wound onto the winding core 33 without any tension at all being applied thereto and without creases being produced and in an extremely smooth fashion.

As described above, the position of the sliding cylinder 77 is simply changed over from the first position to the second position after it has wound thereon the negative electrode plate 1 and is going to supply the same onto the winding core 33, and in either case, the tape suction drum 37 is rotated in the same direction by the tape supply drum 39 or the winding core 33 from the same reference position. Thus the suction holding of the negative electrode plate and the feeding of same as it is smoothly released from this suction holding can both be achieved with such a simple construction. If, for example, the tape suction drum 37 were rotated in opposite directions for holding the negative electrode plate 1 by suction and for supplying the same to the winding core 33, it would be necessary to provide two reference positions at which the tape suction drum 37 must be located for respective operations, for which a complex construction would be required. Moreover, it would not be possible to stick the position locating tape 32 and/or the circumferential tape 10 onto both ends of the negative electrode plate 1, as a result of which the positioning of the negative electrode plate 1 in relation to the separator when being taken up on the winding core 33 would not be easily achieved.

In the above embodiment, the changeover of the suction timing setting grooves 88a to 88e and the release timing setting grooves 89a to 89e is effected by switching over the position of a sliding cylinder in a first position and a second position. It should be noted that any other structures could be adopted as long as it allows the grooves 88a to 88e and the grooves 89a to 89e to be switchably connected to the vacuum source. For instance, instead of the sliding element as in the embodiment described above, a changeover valve that selectively connects all of one or other of the suction timing setting grooves 88a to 88e or the release timing setting grooves 89a to 89e with the vacuum source could be provided within the tape suction drum 37. In this case, the sliding cylinder 77 need not be capable of sliding, and the same effects as described above could be obtained.

Figure 9:
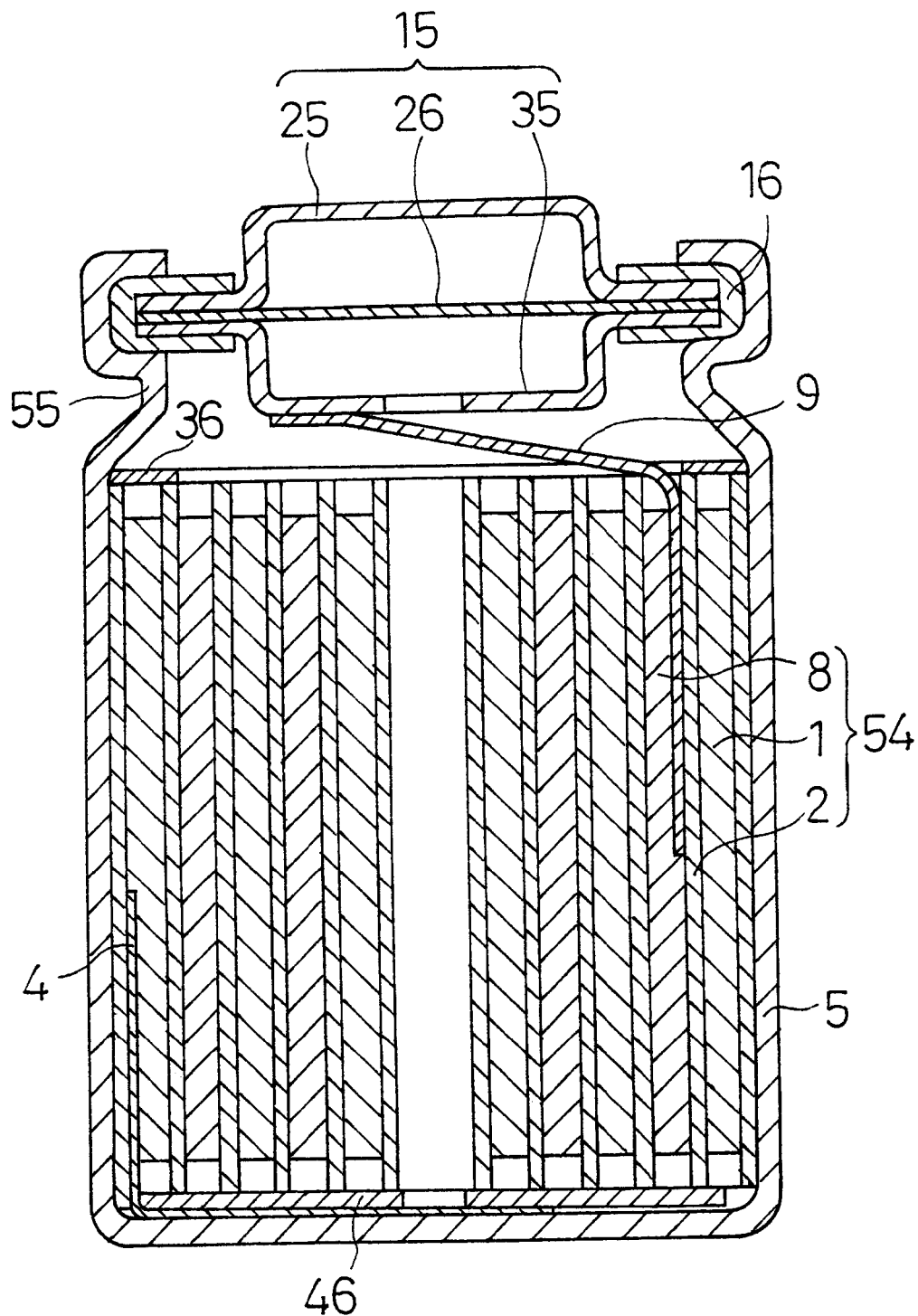
FIG. 9 is a longitudinal cross-sectional view illustrating a non-aqueous electrolyte battery constructed with the spiral electrode group of the present invention.

FIG. 9 is a longitudinal cross-sectional view of a non-aqueous electrolyte battery constructed with the spiral electrode group 54 that is manufactured by the above described apparatus. The drawing shows, by way of example, a lithium primary battery. The spiral electrode group 54, obtained by winding strips of positive and negative electrode plates 1, 8 with intervening separator 2 therebetween into a spiral shape as described above, is housed in a bottomed, cylindrical battery case 5 made of iron which also serves as the negative terminal, together with an organic liquid electrolyte (not shown) which is stable with respect to light metals that constitute the negative electrode active material. The upper open end of the battery case 5 is hermetically sealed by crimping the upper edge of the battery case onto the periphery of a sealing assembly 15 via a packing 16. The sealing assembly 15 comprises an upper lid 25, a valve 26 made of a thin metal film, and a lower lid 35.

The positive electrode plate 8 that constitutes the spiral electrode group 54 is obtained by mixing 7 parts by weight of carbon powder as a conductive agent and 7 parts by weight of fluoride resin powder into the active material of manganese dioxide, packing the thus obtained mixture onto a collector made of an expanded stainless-steel sheet, pressing the metal sheet packed with the mixture with a roll, and cutting the same to predetermined dimensions. Part of the mixture is removed from the expanded stainless-steel sheet, and a positive lead 9 is attached by, for example, welding, to the exposed part of the metal sheet. The negative electrode plate 1 consists of a strip of thin, lithium metal foil tape as described above, to which a negative lead 4 is preliminarily attached at the winding end. The separator 2 consists of a porous polypropylene film.

The spiral electrode group 54 is accommodated within the battery case 5 with insulation plates 36, 46 arranged at its top and its bottom, respectively. The negative lead 4 of the negative electrode plate 1 is bent into the lower face of the lower insulation plate 46, and welded to the bottom of the battery case 5. The positive lead 9 is passed through a central hole in the upper insulation plate 36 and welded to the lower lid 35. After a predetermined amount of liquid electrolyte has been injected into the battery case 5, the sealing assembly 15 mounted with the packing 16 at the periphery thereof is placed upon a stepped portion 55 formed in an upper part of the battery case 5, and the upper end edge of the battery case 5 is crimped inwards, whereby the open end of the battery case 5 is hermetically sealed. The above mentioned stepped portion 55 is formed by a grooving process after the insertion of the spiral electrode group 54 into the battery case 5.

It is advantageous to fabricate the battery using the spiral electrode group 54 obtained by the above described apparatus for the following reasons. Firstly, the spiral electrode group 54 is obtained without using a plurality of non-woven cloth 3 that were necessary in a spiral electrode group of prior art as can be seen from FIGS. 8 and 10, which means the number of components and manufacturing steps can be remarkably reduced with the result that cost cutting to a considerable extent can be achieved. Specifically, the material cost was reduced by 6% for the above battery as compared to a battery of the same type with the conventional spiral electrode group. Moreover, the battery capacity is increased in the above battery by the volume that was occupied by the non-woven cloth 3 which did not contribute to the electricity-generating performance of the battery. Measurement results showed that the capacity of the above battery using the spiral electrode group of the present invention was increased by 8% as compared to a conventional battery of the same type.

Secondly, the negative electrode plate 1 made of a thin lithium metal foil tape is tightly wound around without misalignment, because it is taken up such as not to be subject to tension while it is tightly wound up on the winding core 33 by the frictional force acting between the tape suction drum 37 and the winding core. Accordingly, the occurrence rate of deficiency caused by misalignment during the winding of the electrode plates was made to 0% with the spiral electrode groups 54 of the present invention, while it was 0.05% with the conventional spiral electrode groups. Moreover, the leading end of the positive electrode plate 8 is precisely aligned in relation to the separator 2 as well as to the negative electrode plate 1 by means of a chuck member in the spiral electrode plate group of the present invention until immediately after the winding core 33 starts to rotate. Accordingly, while there used to be variations of ±5% in the relative positions of the positive electrode plate and the separator in the conventional spiral electrode group, there are only ±1% variations in the spiral electrode group 54 according to the present invention. Furthermore, the variations in the widthwise direction of the electrodes were reduced to 0.3 as compared to 0.6 in the conventional spiral electrode groups. Owing to these improvements, the battery performance including discharge characteristics and others of this battery using the spiral electrode group of the present invention is improved without variations.

INDUSTRIAL APPLICABILITY

As described above, according to the apparatus for manufacturing spiral electrode groups of the present invention, one of the electrode plates is subjected to practically no tension at all during it is fed, and therefore prevented from being elongated. Furthermore, one of the electrodes is positioned in relation to the separator by attaching its leading end to the separator with an adhesive patch, while the other one of the electrodes is positioned relative to the separator by means of a chucking member. Therefore, both of the electrode plates can be wound without slackness or misalignment. With the method and apparatus for manufacturing spiral electrode groups of the present invention, therefore, spiral electrode groups for batteries of a desired shape can be reliably manufactured.

What is claimed is:

1. A method of manufacturing spiral electrode groups for batteries wherein a strip of positive electrode and a strip of negative electrode are overlaid upon one another with a separator therebetween and wound up in spiral form, comprising the steps of:

provide a strip of separator to a winding core such that the separator is passed through a slit formed in said winding core in an axial direction and is subjected to a predetermined amount of tension;

providing a strip of negative electrode plate made of a metal foil tape to the winding core from a tape suction drum having a rotation axis parallel to the winding core, said tape suction drum being supported rotatably around its axis and is detachably contacted with the winding core under a predetermined pressure;

driving the winding core to rotate, for causing said tape suction drum to rotate synchronously in contact with the winding core by a frictional force acting therebetween, whereby the negative electrode plate held on said tape suction drum is transferred and taken up on the winding core;

attaching a leading end of the negative electrode plate and overlapping same onto the separator at a position predetermined in relation to the separator;

feeding a positive electrode plate toward the winding core;

chucking a leading end of said positive electrode plate together with the separator at a position predetermined in relation to the separator until immediately before the positive electrode plate is taken up on the winding core; and driving the winding core to further rotate, for winding thereon said negative electrode plate, said separator, and said positive electrode plate in an overlapped condition.

2. The method of manufacturing spiral electrode groups for batteries according to claim 1, wherein said negative electrode plate is fed to the tape suction drum from a tape supply drum which, when contacted with the tape suction drum, rotates synchronously in contact with the tape suction drum, whereby the negative electrode plate held on the tape supply drum is taken up on the tape suction drum, wherein the tape suction drum is provided with a plurality of vacuum suction holes on a circumferential surface thereof, each of said vacuum suction holes being activated in succession to effect vacuum suction holding of the negative electrode plate in synchronism with the taking up of the negative electrode plate on the tape suction drum, and wherein, when the negative electrode plate held on said tape suction drum is transferred and taken up on the winding core, each of said vacuum suction holes cancels the suction holding of the negative electrode plate successively in synchronism with the taking up of the negative electrode plate on the winding core.

3. A non-aqueous electrolyte battery comprising a bottomed cylindrical battery case having an upper open end, a spiral electrode group fabricated by the method of manufacturing spiral electrode groups for batteries as set forth in claim 2, a non-aqueous liquid electrolyte, and a sealing assembly for hermetically sealing said upper open end of the battery case.

4. An apparatus for manufacturing spiral electrode groups for batteries wherein a strip of positive electrode and a strip of negative electrode are overlaid upon one another with a separator therebetween and wound up in spiral form, comprising:

a winding core having a slit formed in said winding core in an axial direction through which a separator is passed;

a tape suction drum for holding by vacuum suction a strip of negative electrode plate made of a metal foil tape on a circumferential surface thereof, having a rotation axis parallel to said winding core, and being supported rotatably around its axis and is detachably contacted with the winding core under a predetermined pressure;

means for feeding a positive electrode plate toward said winding core such as to be overlapped with said separator passing through the slit of the winding core; and means for driving said winding core to rotate, for causing said tape suction drum to rotate synchronously in contact with the winding core by a frictional force acting between the negative electrode plate and one of the winding core and the separator held thereon, whereby the negative electrode plate held on said tape suction drum is transferred and taken up on the winding core, together with the positive electrode and the separator in overlapped fashion.

5. The apparatus for manufacturing spiral electrode groups for batteries according to claim 4, further comprising:

means for attaching a position locating tape to a leading end of the negative electrode plate, said position locating tape having an adhesive surface which sticks by itself to the separator held on the winding core at an instant where the tape suction drum has contacted and started to rotate with the winding core;

means for feeding the separator such as to pass through the slit in the winding core;

means for applying a predetermined tension to the separator; and chucking means arranged retractably near the winding core for chucking a leading end of the positive electrode plate as being overlapped with the separator at a predetermined location in relation to the separator.

6. The apparatus for manufacturing spiral electrode groups for batteries according to claim 5, further comprising:

a rotary support axis around which said tape suction drum is rotatably supported;

a drum support lever which is rotatable around an axis, for supporting at one end thereof said rotary support axis of the tape suction drum; and biasing means connected at the other end of said drum support lever for biasing said drum support lever in one direction such as to cause the tape suction drum to contact with the winding core under a predetermined pressure.

7. The apparatus for manufacturing spiral electrode groups for batteries according to claim 4, further comprising a tape supply drum which holds thereon the negative electrode plate by suction and feeds the negative electrode plate by contacting the tape suction drum and rotates synchronously in contact therewith, wherein said tape suction drum is formed with a plurality of vacuum suction holes in a predetermined arrangement over an entire surface on which the negative electrode plate is wound, each of said vacuum suction holes being connected, in succession, to a vacuum source to effect vacuum suction holding of the negative electrode plate, concurrently as each of said vacuum suction holes is blocked by the negative electrode plate being taken up on the tape suction drum, and wherein, when the negative electrode plate held on said tape suction drum is transferred and taken up on the winding core, each of said vacuum suction holes is disconnected from the vacuum source successively, concurrently as the negative electrode plate separates from each of the vacuum suction holes.

8. The apparatus for manufacturing spiral electrode groups for batteries according to claim 7, wherein the tape suction drum comprises:

a rotary support axis;

a rotary section supported rotatably around said rotary support axis, having said plurality of vacuum suction holes formed on an outer circumferential surface thereof, and a guide recess formed on an inner side thereof;

a sliding section supported slidably on said rotary support axis such as to be fitted in said guide recess of the rotary section; and means for selectively locating said sliding section at a first position predetermined in relation to the rotary section and a second position predetermined in relation to the rotary section, wherein said sliding section comprises a plurality of a first vacuum paths which are successively connected to each of said vacuum suction holes as rotation of the rotary section proceeds in a condition wherein the sliding section is located at said first position, and a plurality of second vacuum paths which are successively disconnected from each of said vacuum suction holes as rotation of the rotary section proceeds in a condition wherein the sliding section is located at said second position, and wherein said first and second vacuum paths are both connected to a vacuum source through an identical vacuum passage.

9. The apparatus for manufacturing spiral electrode groups for batteries according to claim 8, wherein the rotary section is provided, on an inner surface thereof which faces said sliding section, with a plurality of connection holes arranged facing to each of said plurality of vacuum suction holes in a circumferential direction and spaced apart in an axial direction, said connection holes being in constant communication with said plurality of vacuum suction holes; wherein said plurality of first vacuum paths comprise a plurality of first grooves arranged such as to face each of said connection holes in the axial direction when the sliding section is located at the first position, said plurality of grooves having gradually decreasing lengths in the circumferential direction;

said plurality of second vacuum paths comprise a plurality of second grooves arranged such as to face each of said connection holes in the axial direction when the sliding section is located at the second position, said plurality of second grooves having respectively the same lengths as the gradually decreasing lengths of said plurality of first grooves; and wherein the first grooves are arranged such that the length thereof decreases in the axial direction, while the second grooves are disposed in an inverse arrangement in relation to the first grooves, each of the first grooves and each of the second grooves being paired and arranged adjacent each other.

10. The apparatus for manufacturing spiral electrode groups for batteries according to claim 9, further comprising means for fixedly locating the tape suction drum at a reference position at an instant where the tape suction drum is located to contact one of the tape supply drum and the winding core.

11. The apparatus for manufacturing spiral electrode groups for batteries according to claim 7, wherein said tape suction drum comprises:

a rotary support axis;

a rotary section supported rotatably around said rotary support axis, having said plurality of vacuum suction holes formed on an outer circumferential surface thereof;

a stationary section arranged on an inner side of said rotary section, allowing said rotary section to rotate therearound, wherein said stationary section comprises a plurality of first vacuum paths which are successively connected to each of said vacuum suction holes as rotation of the rotary section proceeds, and a plurality of second vacuum paths which are successively disconnected from each of said vacuum suction holes as rotation of the rotary section proceeds;

a vacuum source to which said plurality of first and second vacuum paths are connected through an identical vacuum passage; and a switching valve for selectively connecting all of one or other of said plurality of first vacuum paths or second vacuum paths to said vacuum source through the vacuum passage.

* * * * *